US010656126B2

(12) United States Patent
Sasano

(10) Patent No.: US 10,656,126 B2
(45) Date of Patent: May 19, 2020

(54) PRE-ANALYSIS TREATMENT METHOD FOR SAMPLE CONTAINING PLURALITY OF COMPONENTS WITH GREATLY DIFFERENT CONCENTRATIONS

(71) Applicant: AiSTI SCIENCE CO., Ltd., Wakayama-shi (JP)

(72) Inventor: Ryoichi Sasano, Wakayama (JP)

(73) Assignee: AISTI SCIENCE CO., LTD., Wakayama-shi (JP)

(*) Notice: Subject to any disclaimer, the term of this patent is extended or adjusted under 35 U.S.C. 154(b) by 295 days.

(21) Appl. No.: 15/745,841

(22) PCT Filed: Dec. 28, 2016

(86) PCT No.: PCT/JP2016/089067
§ 371 (c)(1),
(2) Date: Jan. 18, 2018

(87) PCT Pub. No.: WO2017/115841
PCT Pub. Date: Jul. 6, 2017

(65) Prior Publication Data
US 2018/0209945 A1 Jul. 26, 2018

(30) Foreign Application Priority Data

Dec. 29, 2015 (JP) .................................. 2015-257662
Jan. 26, 2016 (JP) .................................. 2016-012678

(51) Int. Cl.
*G01N 30/06* (2006.01)
*G01N 1/10* (2006.01)
(Continued)

(52) U.S. Cl.
CPC ........... *G01N 30/06* (2013.01); *B01D 15/362* (2013.01); *B01D 15/363* (2013.01); *G01N 1/10* (2013.01);
(Continued)

(58) Field of Classification Search
CPC ... G01N 30/06; G01N 1/10; G01N 1/34; G01N 30/88; G01N 30/96; G01N 1/40; B01D 15/36; B01D 11/02
(Continued)

(56) References Cited

U.S. PATENT DOCUMENTS 5,358,690 A * 10/1994 Guirguis ............ A61B 10/0045
422/420
2002/0197629 A1* 12/2002 Gjerde ................. B01D 15/366
435/6.12
(Continued)

FOREIGN PATENT DOCUMENTS

JP 2961680 B2 10/1999
WO 2005116629 A1 12/2005

OTHER PUBLICATIONS

Castillo, M. et al, Waste Management 1999, 19, 101-110.*
(Continued)

*Primary Examiner* — Arlen Soderquist
(74) *Attorney, Agent, or Firm* — Kratz, Quintos & Hanson, LLP

(57) ABSTRACT

A pre-analysis treatment method includes: a first retaining step of supplying, to a solid phase, each predetermined amount of the sample and a first solvent, and allowing a component at low concentration to be retained in the solid phase; a first washing step of supplying the first solvent to the solid phase and removing a component at high concentration from the solid phase; a second retaining step of supplying the sample in a smaller amount than the predetermined amount supplied in the first retaining step, and a second solvent to the solid phase, and allowing the component at high concentration to be retained in the solid phase; and an elution step of simultaneously extruding the components retained in the solid phase with an extrusion solvent.

20 Claims, 5 Drawing Sheets

(51) Int. Cl.
*G01N 1/34* (2006.01)
*G01N 30/88* (2006.01)
*G01N 1/40* (2006.01)
*B01D 15/36* (2006.01)
*B01D 11/02* (2006.01)
*G01N 30/96* (2006.01)
*G01N 30/02* (2006.01)

(52) U.S. Cl.
CPC ............... *G01N 1/34* (2013.01); *G01N 1/405* (2013.01); *G01N 1/4055* (2013.01); *G01N 30/88* (2013.01); *G01N 30/96* (2013.01); *B01D 11/0288* (2013.01); *G01N 2030/025* (2013.01); *G01N 2030/027* (2013.01); *G01N 2030/067* (2013.01)

(58) Field of Classification Search
USPC .......................................... 436/90, 161, 178
See application file for complete search history.

(56) References Cited

U.S. PATENT DOCUMENTS

| | | | | |
|---|---|---|---|---|
| 2003/0139886 A1* | 7/2003 | Bodzin | ................ | G01N 21/47 702/28 |
| 2003/0153011 A1* | 8/2003 | Bell | ................ | G01N 33/54393 435/7.9 |
| 2004/0142488 A1* | 7/2004 | Gjerde | ................ | B01L 3/0275 436/178 |
| 2004/0223880 A1* | 11/2004 | Gjerde | ................ | G01N 1/34 422/70 |
| 2005/0258097 A1* | 11/2005 | Gjerde | ................ | B01J 20/285 210/635 |
| 2005/0276727 A1* | 12/2005 | Pawliszyn | ........ | A61B 5/14514 422/537 |
| 2006/0013732 A1* | 1/2006 | Parthasarathy | ..... | B01F 11/0002 422/68.1 |
| 2006/0021939 A1* | 2/2006 | Mallet | ................ | B01J 20/26 210/656 |
| 2006/0198765 A1* | 9/2006 | Gjerde | ................ | B01D 15/424 422/400 |
| 2006/0216206 A1* | 9/2006 | Hudson | ............. | B01J 20/28042 422/534 |
| 2007/0196833 A1* | 8/2007 | Gjerde | ................ | B01L 3/5025 435/6.12 |
| 2007/0205156 A1* | 9/2007 | Lee | ........................ | B01J 20/26 210/656 |
| 2008/0090295 A1* | 4/2008 | Feuerstein | .......... | G01N 35/028 436/54 |
| 2008/0214794 A1* | 9/2008 | Gjerde | ................ | C07K 1/22 530/415 |
| 2009/0084680 A1* | 4/2009 | Chung | ................ | G01N 1/405 204/452 |
| 2010/0237235 A1* | 9/2010 | Ozbal | ................ | G01N 30/24 250/282 |
| 2011/0192797 A1* | 8/2011 | Gjerde | ................ | B01J 20/285 210/656 |
| 2014/0096596 A1* | 4/2014 | Brousmiche | .......... | B01J 20/285 73/61.52 |
| 2015/0258542 A1* | 9/2015 | Kabir | ................ | B01J 20/286 422/430 |
| 2015/0318158 A1* | 11/2015 | Pawliszyn | .............. | G01N 1/405 250/282 |
| 2016/0169780 A1* | 6/2016 | Ju | ........................ | C12Q 1/6816 436/501 |
| 2017/0138940 A1* | 5/2017 | Goethel | ............. | B01D 15/3885 |

OTHER PUBLICATIONS

Mateo-Vivaracho, L. et al, Journal of Chromatography A 2008, 1185, 9-18.*
Zhu, W.-X. et al, Journal of Chromatography A 2008, 1207, 29-37.*
International Search Report for International Application No. PCT/JP2016/089067 dated Apr. 4, 2017.

* cited by examiner

PRE-ANALYSIS TREATMENT METHOD FOR SAMPLE CONTAINING PLURALITY OF COMPONENTS WITH GREATLY DIFFERENT CONCENTRATIONS

TECHNICAL FIELD

The present invention relates to a pre-analysis treatment method for pretreating a sample to be analyzed so as to be suitable for measurement when performing a measurement by, for example, a gas chromatograph or the like, and especially relates to a pre-analysis treatment method for analyzing a sample to be analyzed, which contains a plurality of components with greatly different concentrations.

BACKGROUND ART

In recent years, analysis methods for searching for biological phenomena not appearing in the appearance have attracted attention, by comprehensively analyzing relative variations of metabolites contained in living bodies. This analysis method is called metabolome analysis and the like, and is attempted to be applied in a medical field such as diagnosis of disease and analysis of etiology, a medicine field such as toxicity of pharmaceuticals and the like or side effect test. In addition to the field related to medicine, application is also expected in fields such as food quality control, quality appraisal, quality prediction, food safety assessment, food production optimization, and breeding of industrial microorganisms, plants and the like.

As described above, in the metabolome analysis, for example, in order to analyze a relative variation of a substance to be analyzed or the like, it is necessary to perform a pretreatment of a sample to be analyzed, measure the substance to be analyzed using the analytical sample obtained by the pretreatment, and perform analysis based on the measurement result. In this case, a gas chromatography mass spectrometer, a liquid chromatography mass spectrometer or the like is generally used as an apparatus for measuring the substance to be analyzed. On the other hand, a sample derived from a living body such as human or a sample derived from food contains a large number of components in various concentration ranges. However, the concentration range measurable by one treatment in an analyzer such as a gas chromatograph is limited. For example, a low concentration component is in a measurable range, but a component at high concentration exceeds the measurable range. Thus it is impossible to obtain the measurement result of the necessary component in one measurement with respect to one sample, and it is necessary to perform measurement twice or more. In addition, when components at high concentration in which the retention times of the chromatograph are close to each other exist in large number, it becomes difficult to detect or quantify the peak of a component at low concentration in which the retention time is close to them, and it becomes difficult to analyze the component at low concentration. Furthermore, for example, when a large amount of high concentration components are introduced into a separation column such as a gas chromatograph, the retainable capacity of the liquid phase of the separation column is exceeded. This causes the retention time including those for the target components sometimes largely shifts. When the retention time shifts, analysis becomes difficult. Especially when measuring multiple components like metabolome analysis, analysis is hindered.

In response to such a situation, a chromatograph which makes it possible to measure a wide range of components from high concentration components to low concentration components has been proposed. For example, Patent Literature 1 has proposed a gas chromatograph that is equipped with a sample valve, a measuring tube, a column, and a detector, and includes four valves. The four valves are: a stop valve; a pressure reducing valve; and a three-way valve alternately introducing a sample gas and a standard gas, which are arranged in this order from the sample valve side in an inflow passage of the sample gas; and a stop valve which is arranged in a discharge passage of the sample gas. The gas chromatograph also includes a calculation section for controlling these four valves. In this gas chromatograph, it is considered that a wide range of components can be measured by having configuration in which the sample amount increases or decreases regardless of the size of the measuring tube.

Further, as a method of detecting a peak by adjusting a retention time in a chromatograph, it has been proposed to change the concentration of the elution solvent, for example, in separation and elution of the analyte by liquid chromatography. For example, Patent Literature 2 discloses, as a method of analyzing an amino-functional compound liquid containing various kinds of amino acids and derivatives thereof contained in a living body and amino acid analogous substances, a method of analyzing an amino-functional compound. The method includes steps of reacting an amino-functional compound in a sample containing the amino-functional compound with a derivatization reagent to produce a predetermined amino-functional compound derivative, eluting the amino-functional compound derivative by liquid chromatography using a stepwise concentration gradient elution means, and detecting, by mass spectrometry, the amino-functional compound derivative eluted by the liquid chromatography.

CITATIONS LIST

Patent Literature 1: JP 2961680 B2
Patent Literature 2: WO 2005/116629 A

SUMMARY OF INVENTION

Technical Problems

However, in the gas chromatograph described in Patent Literature 1, the sample itself is used as it is. Accordingly, the problem that it becomes difficult to measure a component at low concentration in which the retention time is close to the retention time of a component at high concentration is unresolved. Further, in the method described in Patent Literature 2, it is possible to previously separate and elute by liquid chromatography a plurality of amino-functional compounds that is difficult to separately detect by mass spectrometry due to their same mass, by using a stepwise concentration gradient elution means. However, for example, a difference in concentration of the amino-functional compound and pretreatment such as reacting the amino-functional compound with a derivatization reagent are not taken into consideration at all. It is therefore an object of the present invention to provide a pre-analysis treatment method in which greatly different concentrations of a plurality of components contained in a sample are individually adjusted to predetermined ranges, and thus a plurality of components can simultaneously be measured with a single treatment in a measurement after pre-analysis treatment.

Solutions to Problems

In view of the aforementioned problems of the prior art, the inventors of the present invention have conducted intensive studies, and consequently obtained a knowledge by supplying a component at relatively low concentration and a component at relatively high concentration to a solid phase with varying supply amounts, and also by a combination of the component at low concentration, the component at high concentration, the solid phase, and a solvent. The knowledge is: (i) it is possible to adjust retention in the solid phase and elution of each component, and (ii) when it is possible to adjust retention in the solid phase and elution of each component, and a sample with a predetermined volume is supplied to the apparent volume of the solid phase, the sample can be captured to the solid phase regardless of the above combination, and then it is possible to remove volatile components such as solvent by supplying gas. Based on these findings, it has been found that the above-described problems can be solved, thereby completing the present invention. An aspect of the present disclosure is as follows.

(1) A pre-analysis treatment method for obtaining an analytical sample in which greatly different concentrations of a plurality of components contained in a sample are individually adjusted to predetermined ranges, the pre-analysis treatment method includes:

a first retaining step of supplying, to a solid phase, a predetermined amount of the sample containing the plurality of components with the greatly different concentrations, and a predetermined amount of a first solvent, and allowing a component at relatively low concentration to be retained in the solid phase;

a first washing step of further supplying the first solvent to the solid phase and removing a component at relatively high concentration from the solid phase;

a second retaining step of supplying the sample in a smaller amount than the predetermined amount supplied in the first retaining step, and a second solvent to the solid phase that has undergone the first washing step, and allowing the component at relatively high concentration to be retained in the solid phase; and an elution step of simultaneously extruding the components retained in the solid phase with an extrusion solvent to obtain the analytical sample, the first solvent is capable of dissolving the component at relatively low concentration and the component at relatively high concentration, and having characteristics of allowing the component at relatively low concentration to be retained in the solid phase and preventing the component at relatively high concentration from being retained, and the second solvent has a characteristic of allowing the component at relatively low concentration and the component at relatively high concentration to be retained in the solid phase.

(2) In the pre-analysis treatment method according to (1) above, the second solvent is a mixed solvent of a first solvent and a solvent different from the first solvent.

(3) In the pre-analysis treatment method according to (1) or (2) above, the first solvent is a mixed solvent containing a water-soluble organic solvent and water, and the second solvent is a mixed solvent of the first solvent and the water-soluble organic solvent contained in the first solvent.

(4) In the pre-analysis treatment method according to (3) above, a weight ratio (A/B) of the water-soluble organic solvent (A) to the water (B) in the first solvent is 9/1 to 0/1, and a ratio (A/B) of the second solvent is 500/1 to 20/1.

(5) In the pre-analysis treatment method according to any one of (1) to (4) above, a non-aqueous solvent is further supplied in the first washing step, and the pre-analysis treatment method includes a second washing step of supplying a non-aqueous solvent after completion of the second retaining step.

(6) In the pre-analysis treatment method according to (1) or (2) above, the component at relatively low concentration has a charge bias smaller than that of the component at relatively high concentration, the solid phase is constituted by a carrier having a nonpolar functional group, the first solvent has a polarity that allows the component at relatively low concentration to be retained in the solid phase and prevents the component at relatively high concentration from being retained in the solid phase, the second solvent is a mixed solvent of the first solvent and a solvent having a polarity higher than that of the first solvent, and has a polarity that allows the component at relatively low concentration and the component at relatively high concentration to be retained in the solid phase, and the extrusion solvent has a polarity lower than that of the first solvent.

(7) In the pre-analysis treatment method according to (1) or (2) above, the component at relatively low concentration has a charge bias larger than that of the component at relatively high concentration, the solid phase is constituted by a carrier having a polar functional group, the first solvent has a polarity that allows the component at relatively low concentration to be retained in the solid phase and prevents the component at relatively high concentration from being retained in the solid phase, the second solvent is a mixed solvent containing the first solvent and a solvent having a polarity lower than that of the first solvent, and has a polarity that allows the component at relatively low concentration and the component at relatively high concentration to be retained in the solid phase, and the extrusion solvent has a polarity higher than that of the first solvent.

(8) In the pre-analysis treatment method according to (6) or (7) above, the first solvent contains a water-soluble organic solvent.

(9) In the pre-analysis treatment method according to (1) above, the second retaining step includes:

a capturing step of supplying the sample in a smaller amount than the predetermined amount supplied in the first retaining step and a volume larger than 0% and 25% or less of the apparent volume of the solid phase, to the solid phase that has undergone the first washing step, and allowing the sample containing the component at relatively high concentration to be captured to the solid phase;

a drying step of supplying gas to the solid phase that has undergone the capturing step and removing volatile components to dry the solid phase; and a second washing step of supplying a second solvent to the solid phase that has undergone the drying step to remove contaminants.

(10) In the pre-analysis treatment method according to (9) above, the first washing step includes a step of supplying the gas after the first solvent.

(11) The pre-analysis treatment according to any one of (1) to (5), (9), and (10) above, includes a derivatization step of supplying a derivatization reagent to the solid phase, prior to the elution step, to derivatize a component retained in the solid phase and liberate the component from the solid phase, and the elution step is a step of supplying an extrusion solvent to the solid phase after completion of the derivatization step, and simultaneously extruding the derivatized component from the solid phase to obtain the analytical sample.

(12) In the pre-analysis treatment method according to any one of (9) to (11) above, the first solvent is a mixed solvent containing a water-soluble organic solvent and water.

(13) In the pre-analysis treatment method according to (12) above, the weight ratio (A/B) of the water-soluble organic solvent (A) to the water (B) in the first solvent is from 9/1 to 0/1.

(14) In the pre-analysis treatment method according to any one of (3) to (5), (8), (12), and (13) above, the water-soluble organic solvent is at least one selected from acetonitrile, acetone, and methanol.

(15) In the pre-analysis treatment method according to any one of (1) to (14) above, the sample contains a component having an alcoholic hydroxyl group as the component at relatively high concentration and contains a component having a carboxyl group or an amino group as the component at relatively low concentration, and the solid phase is constituted by a carrier having at least one functional group selected from polar functional groups and ion-exchangeable functional groups.

(16) In the pre-analysis treatment method according to (15) above, the component that has the alcoholic hydroxyl group and is contained in the sample is a saccharide, and the component at relatively low concentration contained in the sample is at least one selected from amine compounds, amino acids, and organic acids.

(17) In the pre-analysis treatment method according to (15) or (16) above, the solid phase has a plurality of ion-exchangeable functional groups having different charges as the ion-exchangeable functional groups.

(18) In the pre-analysis treatment method according to (17) above, the ion-exchangeable functional group is a strong ion-exchangeable functional group.

(19) In the pre-analysis treatment method according to any one of claims (1) to (18) above, a ratio of concentrations of the component at relatively high concentration and the component at relatively low concentration (high concentration/low concentration) contained in the sample is 20 or more.

(20) An analysis method includes a step of simultaneously measuring a plurality of components that has greatly different concentrations and are contained in a sample, using the analytical sample obtained by the pre-analysis treatment method as defined in any one of (1) to (19) above.

In the present invention, the difference in charge bias between the high concentration component and the low concentration component which are contained in the sample can be determined by n-octanol/water partition coefficient (LogPow) and acid dissociation constant (pKa). Also, in the present invention, the polarity difference in the solvent can be determined by the n-octanol/water partition coefficient (LogPow), dipole moment, and dielectric constant.

In the present invention, "retain" means a case where a solid phase and components with high and low concentrations have an interaction relating to a solvent, and "capture" means a case of containing a solid phase and components with high and low concentrations, which do not have an interaction relating to a solvent.

Advantageous Effects of Invention

According to the present invention, it is possible to easily obtain an analytical sample in which greatly different concentrations of a plurality of components contained in a sample are individually adjusted to predetermined ranges. Further, by using this analytical sample, it becomes possible to simultaneously measure a plurality of components by one treatment with an analyzer such as a gas chromatography mass spectrometer.

DESCRIPTION OF EMBODIMENTS

[Pre-Analysis Treatment Method]

Figure 1:
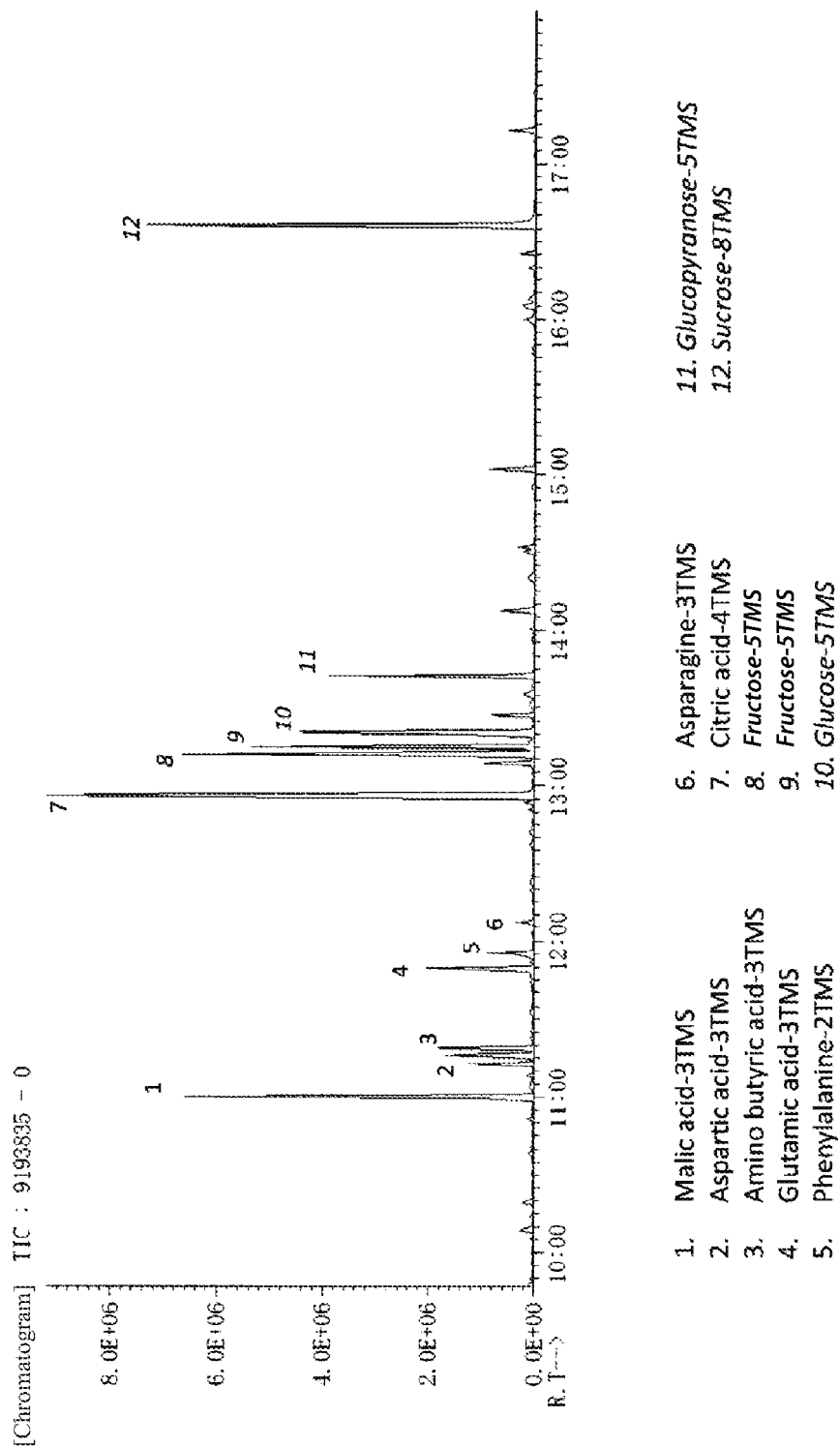
FIG. 1 shows a chromatogram of an analytical sample that contains a trimethylsilylated component and is obtained in Example 1, by a gas chromatography mass spectrometer.

The pre-analysis treatment method according to the present invention is for obtaining an analytical sample in which greatly different concentrations of a plurality of components contained in a sample are individually adjusted to predetermined ranges. This pre-analysis treatment method includes a first retaining step of supplying each predetermined amount of a sample containing a plurality of components with greatly different concentrations and a first solvent to a solid phase, and retaining a component at relatively low concentration in the solid phase, a first washing step of further supplying the first solvent to the solid phase and removing a component at relatively high concentration from the solid phase, a second retaining step of supplying the sample in a smaller amount than the predetermined amount supplied in the first retaining step, and a second solvent to the solid phase after the first washing step, and retaining a component at relatively high concentration in the solid phase, and an elution step of simultaneously extruding the components retained in the solid phase with an extrusion solvent to obtain an analytical sample. Here, the first solvent used at this time is capable of dissolving the component at relatively low concentration and the component at relatively high concentration, and has characteristics of allowing the component at low concentration to be retained in the solid phase and preventing the component at high concentration from being retained in the solid phase. In addition, the second solvent has a characteristic of retaining the component at low concentration and the component at high concentration in the solid phase.

In the pre-analysis treatment method, firstly, a sample to be analyzed containing the component at low concentration (hereinafter also referred to as "low concentration component") and the component at high concentration (hereinafter also referred to as "high concentration component") and the first solvent are supplied to the solid phase, and the high concentration component is not retained in the solid phase and only the low concentration component is retained in the solid phase. Thereafter, the same sample to be analyzed is again supplied to the solid phase so as to have a smaller amount than that at the time of the previous supply, and the low concentration component and the high concentration component are retained in the solid phase. In this way, the supply amount of the sample at the time of retaining the high concentration component in the solid phase is reduced in comparison with a supply amount of the sample at the time when only the low concentration component is retained in the solid phase, thereby reducing the amount of the high concentration component retained in the solid phase. Therefore, it becomes possible to adjust the amount of the low concentration component and the amount of the high concentration component retained to the solid phase to predetermined ranges. Further, it is possible to calculate the concentrations of each component contained in the sample based on the supply amount in this case. Therefore, in a measurement performed after the pretreatment, it is possible to simultaneously measure a plurality of components that are contained in the sample to be analyzed, and have greatly different concentrations, using a pretreated sample. In addition, the retaining amount of the high concentration component can be decreased. Accordingly, even when the retention times of the gas chromatogram are close to each other in the measurement performed after the pretreatment, for example, it is possible to reduce an effect of the high concentration component onto the low concentration component, which makes it possible to measure more components. Moreover, it is possible to avoid a situation where a high concentration component is introduced in large quantities into a separation column of a chromatograph, and multi-component measurement such as metabolome analysis can be stably performed.

As the sample to be analyzed applicable to such pre-analysis treatment, any sample which needs to comprehensively measure components which are various chemical substances that can be contained in the sample to be analyzed, by using, for example, an analysis method of metabolome analysis, may be used. Also, it is generally considered that various kinds of chemical substances are contained in various concentration ranges in such sample to be analyzed. Examples of such sample to be analyzed include body fluids derived from organisms, foods and beverages (including raw meat, vegetables, processed products, etc.), culture fluids excluding foods and beverages) such as cells and microorganisms, plants (excluding foods and beverages), and the like. The body fluids derived from organisms include blood, lymph fluid, cerebrospinal fluid, saliva, urine, and the like. In addition, it is preferable that the sample to be analyzed is prepared into a liquid form that can be loaded on a solid phase, as necessary. For example, a liquid that can contain various components is obtained by crushing, centrifugal separation treatment, or the like. A plurality of components can also be contained in various concentrations in the liquid thus obtained. For example, in a sample to be subjected to metabolome analysis, in many cases, it is generally known what kind of component is contained to what extent in the sample to be analyzed, and those skilled in the art can easily assume a high concentration component and a low concentration component. In the case of completely unknown samples, however, a preliminary experiment is performed to confirm a high concentration component and a low concentration component.

Also, applicable components are any components that can be analytical objects of, for example, metabolome analysis, and examples thereof include saccharides, amino acids, organic acids, amine compounds, glycerides, alkaloids, steroids, flavonoids, proteins, sugar phosphates, nucleic acids, carotenoids, nucleosides, terpenes, and the like. Among them, a component having an alcoholic hydroxyl group and a component having a carboxyl group or an amino group are preferable. When these components are contained in the sample as a high concentration component or a low concentration component, it is possible to adjust the concentrations of each component to predetermined ranges and simultaneously measure in the measurement after pre-analysis treatment.

For applicable amino acid, any amino acid that has an amino group and a carboxyl group can be used, and examples thereof include an $\alpha$-amino acid in which an amino group is also bonded to a carbon to which a carboxyl group is bonded, but it is not limited thereto. Examples include proline, serine, threonine, asparagine, aspartic acid, glutamic acid, aminobutyric acid, and the like, but it is not limited thereto.

For applicable organic acid, any organic compound having a carboxyl group (excluding amino acid) can be used, and examples thereof include carboxylic acids having a carbon number of 1 or more. Among them, a carboxylic acid having a carbon number of 2 to 40 is preferable. For example, applicable organic acid is a formic acid, a short-chain fatty acid, a medium-chain fatty acid, a long-chain fatty acid, an aromatic carboxylic acid, a hydroxy acid (citric acid, citrate, or the like), or the like. These fatty acids may be saturated fatty acids or unsaturated fatty acids (may be monovalent unsaturated fatty acids or divalent or more unsaturated fatty acids). Further, it may be a monovalent carboxylic acid or a divalent or more valent carboxylic acid. As will be described later, saccharides based on nutrition labeling standards include certain organic acids, and are classified as organic acids in the present invention.

For applicable saccharide, any saccharide (excluding organic acids) based on Japanese nutrition labeling standards may be used, and is a saccharide (monosaccharide and disaccharide), trisaccharide or higher oligosaccharide and polysaccharide, sugar alcohol, or the like. Among them, a saccharide is more preferable. The three-dimensional structure of the saccharide may be either linear or cyclic.

For applicable amine compound, any compound in which a hydrogen atom of ammonia is substituted with a hydrocarbon residue or the like, and any of a primary amine, a secondary amine, and a tertiary amine may be used. The structure may be either linear or cyclic. In addition, the amine compound is also a compound having an amino group (excluding amino acids), the number of amino group is not particularly limited, and the amine compound may be either monoamine or polyamine. The hydrocarbon residue includes alkyl groups which may have a substituent, aryl groups which may have a substituent, and the like. Examples of such amine compound include aliphatic amines, aromatic amines, heterocyclic amines and the like, and examples thereof include methylamine, dimethylamine, trimethylamine, ethylamine, diethylamine, triethylamine, ethylenediamine, triethanolamine, N,N-diisopropylethylamine, tetramethylethylenediamine, hexamethylenediamine, spermidine, spermine, amantadine, aniline, phenethylamine, toluidine, catecholamine, 1,8-bis(dimethylamino)naphthalene, pyrrolidine, piperidine, piperazine, morpholine, quinuclidine, pyrrole, pyrazole, imidazole, pyridine, pyridazine, pyrimidine, pyrazine, oxazole, thiazole, 4-dimethylaminopyridine, and the like.

For applicable glyceride, an ester of glycerin or polyglycerin and a fatty acid, any of monoglyceride, diglyceride, triglyceride, and polyglycerol fatty acid ester may be used. The carbon number of the fatty acid constituting the glyceride is preferably 10 to 40. Triglyceride corresponds to fat which is stored in the body fatty tissue and the like, oil and fat in foods, and the like. Monoglyceride, diglyceride, and polyglycerol fatty acid ester correspond to emulsifiers contained in foods and the like.

Applicable alkaloid is a nitrogen-containing organic compound derived from natural product, except biomolecules that fall into other categories such as amino acids and nucleic acids. Examples of the alkaloid include pyrrolidine derivatives such as cuscohygrine, hygrine, and hygroline, tropane derivatives such as atropine, cocaine, and ergonin, pyrrolizidine derivatives such as retronecine, indicine, platyphylline, and loline, piperidine derivatives such as sedamine and coniine, quinolizidine derivatives such as lupinine, cytisine, sparteine, matrine, and ormosanine, indolizidine derivatives such as swainsonine, pyridine derivatives such as trigonelline, nicotine, actinidin, and evonine, sinomenine isoquinoline derivatives and analogous alkaloids such as salsoline, N-methylcoridaldine, cryptostilin, papaverine, berberine, hydrastine, glaucine, morphine, codeine, thebaine, and lycorine, oxazole derivatives such as annuloline, isoxazole derivatives such as ibotenic acid, thiazole derivatives such as nostocyclamide, quinazoline derivatives such as febrifugine, glycorine, and vazicine (peganine), acridine derivatives such as rutacridone, quinoline derivatives such as cusparine, quinine, quinidine and cinchonine, indole derivatives such as serotonin, harmine, physostigmine (eserine), ergotamine, strychnine, ibogamine, and vinca alkaloids, imidazole derivatives such as histamine, alkaloids containing a nitrogen heterocycle such as purine derivatives such as caffeine, theobromine, theophylline, and saxitoxin, β-phenethylamine derivatives such as tyramine, ephedrine, pseudoephedrine, adrenaline, noradrenaline, and dopamine, alkaloids having nitrogen in the side chain, such as colchicine alkaloids such as colchicine, polyamine alkaloids such as putrescine derivatives, spermidine derivatives, and spermine derivatives, and the like.

Applicable steroid is not particularly limited as long as it has a basic structure in which three six-membered rings of carbons are combined with one five-membered ring ($C_{18}H_{28}$, steroid skeleton), and for example, any of cholestane, cholane, pregnane, androstane, and estrane may be used. Alternatively, it may be a derivative thereof. Examples of such derivative include sterols having a hydroxyl group at the 3-position of an A ring of cholestane, and the like. Also, examples of the sterol include animal-derived cholesterol, plant-derived phytosterol, and the like.

Applicable flavonoid is not particularly limited as long as it has flavan as a basic skeleton, and examples thereof include flavan, isoflavone, flavanone, chalcone, anthocyanin, catechin, flavone, flavonol, and the like, and derivatives thereof.

The sample to be analyzed contains a plurality of components with greatly different concentrations. The greater the difference in concentration, the more the effect of the present invention is exhibited. Such difference in concentration is preferably applied when a ratio of concentrations of component at high concentration to component at low concentration (high concentration/low concentration) is 20 or more.

As an embodiment of the pre-analysis treatment method described above, there are roughly two methods. Embodiments of each method will be described hereinbelow.

<First Pre-Analysis Treatment Method>

In the first pre-analysis treatment method (hereinafter sometimes referred to as the "first method"), each predetermined amount of a sample containing a plurality of components with greatly different concentrations and a first solvent is supplied to the solid phase, and a component at relatively low concentration is retained in the solid phase, in the first retaining step.

At this time, an embodiment of the sample to be supplied to the solid phase can be appropriately selected according to the characteristics of the sample. For example, in the case of a liquid sample, it may be used as it is, a diluted solution obtained by diluting a liquid sample with a diluent solvent may be used, or a supernatant obtained by diluting a sample with a diluent solvent and then subjecting to centrifugation treatment may be used as a sample. As the diluent solvent for diluting a sample, it is preferable to use the first solvent, from the viewpoint of interaction with the solid phase in the first retaining step.

As the first solvent, one capable of dissolving a component at relatively low concentration and a component at relatively high concentration is used. This makes it possible to selectively retain the low concentration component in the solid phase by utilizing the interaction of the low concentration component and the high concentration component with the solid phase. In addition, the first solvent has characteristics of allowing the component at low concentration to be retained in the solid phase and preventing the component at high concentration from being retained in the solid phase. Such first solvent can be determined in consideration of a relationship of interaction among the solid phase and the low concentration component and the high concentration component. More specific embodiment will be described later.

The way of supplying the sample and the first solvent to the solid phase is not particularly limited, and the first solvent may be supplied after the sample is supplied, the sample and the first solvent may be supplied at the same time, each may be divided and supplied in an arbitrary order, or other modes may be used. In addition, the mode of supplying the sample and the first solvent at the same time includes a case of supplying a mixed solution of the sample and the first solvent. In addition, the mixed solution includes one substantially adjusted so as to contain a predetermined component in the first solvent.

As described above, "each predetermined amount of a sample and a first solvent is supplied to the solid phase" includes a mode in which the sample and the first solvent are separately and sequentially supplied from separate supply sources in predetermined amounts, a mode in which the sample and the first solvent are simultaneously supplied from separate supply sources in predetermined amounts, a mode in which the sample and the first solvent are simultaneously supplied as a diluted solution obtained by diluting the sample with the first solvent, and other modes.

After the first retaining step, a first washing step is performed. In the first washing step, the first solvent is further supplied to the solid phase, and the component at relatively high concentration is removed from the solid phase. In this way, a remaining high concentration component that is not retained in the solid phase during the first retaining step is removed from the solid phase, thereby allowing only the low concentration component to exist in the solid phase. Whereby, only the high concentration component retained in the solid phase in the second retaining step can be allowed to exist in the analytical sample to be obtained.

After the first washing step, a second retaining step is performed. In the second retaining step, the sample in a smaller amount than the predetermined amount supplied in the first retaining step and the second solvent are supplied to the solid phase after the first washing step, and the component at relatively concentration is retained in the solid phase.

At this time, the embodiment of the sample to be supplied to the solid phase is not particularly limited as long as the amount of the sample is smaller than the predetermined amount supplied in the first retaining step. For example, in the case of a liquid sample, it may be used as it is to make the supply amount itself small so that the supply amount of the high concentration component is smaller than that in the first retaining step, or in the case of a diluted solution obtained by diluting the liquid sample, the dilution ratio may be made larger than that in the first retaining step so that the supply amount of the high concentration component is smaller than that in the first retaining step. In the case of using a diluted solution in the first retaining step, it is efficient to further dilute the diluted solution used in the first retaining step with a diluent solvent, in the second retaining step. As the diluent solvent in this case, it is preferable to use a second solvent, from the viewpoint of interaction with the solid phase in the second retaining step.

As the second solvent, one having a characteristic of allowing the component at low concentration and the component at high concentration to be retained in the solid phase is used. As the second solvent in such first method, a mixed solvent of the first solvent with a different solvent, which has a characteristic of allowing the component at low concentration and the component at high concentration to be retained in the solid phase is preferable, from the viewpoint of ease of preparation of the second solvent in consideration of the interaction with the solid phase. Such second solvent can be determined in consideration of the relationship of interaction among the solid phase and the low concentration component and the high concentration component. More specific embodiment will be described later.

The way of supplying the sample and the second solvent to the solid phase is not particularly limited, and the second solvent may be supplied after the sample is supplied, the sample and the second solvent may be supplied at the same time, each may be divided and supplied in an arbitrary order, or other modes may be used. In addition, the mode of supplying the sample and the second solvent at the same time includes a case of supplying a mixed solution of the sample and the second solvent. In addition, the mixed solution includes one substantially adjusted so as to contain a predetermined component in the second solvent.

In the first method, it is preferable to perform a second washing step of supplying a washing solvent to the solid phase after the second retaining step, in order to remove a remaining component or others that are not retained in the solid phase. The washing solvent in this case is not particularly limited as long as it is a solvent which does not affect the interaction of the solid phase with the high concentration component and the low concentration component retained in the solid phase, and examples thereof include the second solvent. As will be described later, when performing derivatization of the components retained in the solid phase, a non-aqueous solvent other than the second solvent may be used.

The elution step is performed after the second retaining step or after the second washing step performed as necessary. In the elution step, the components retained in the solid phase are simultaneously extruded with an extrusion solvent to obtain an analytical sample.

The extrusion solvent can be determined in consideration of the relationship of interaction among the solid phase and the low concentration component and the high concentration component. That is, it is preferable to use one having higher affinity with the high concentration component and the low concentration component than the solid phase. More specific embodiment will be described later.

When the elution step is completed, a constant volume step may be performed as necessary. In the constant volume step, the analytical sample is diluted with an extrusion solvent in order to adjust the analytical sample to a desired volume.

Hereinafter, the embodiment of the first method will be described in more detail according to the high concentration component and the low concentration component contained in the sample to be analyzed. However, the first method is not limited to these embodiments, and can be carried out in various forms without departing from the scope of the present invention, as a matter of course.

First Embodiment

In a first embodiment, a sample contains a component having an alcoholic hydroxyl group as a component at relatively high concentration and a component having a carboxyl group or an amino group as a component at relatively low concentration, and a solid phase is constituted by a carrier having at least one functional group selected from polar functional groups and ion-exchangeable functional groups. That is, in the first embodiment, a low concentration component has a charge bias, which is larger than that of a high concentration component, since the sample contains an ionic functional group as the low concentration component, and a polar functional group as the high concentration component. Also in this case, since a pre-analysis treatment is performed with the above step, specific details of this embodiment will be described below.

As the component having an alcoholic hydroxyl group, a component having a solubility in water of 1 g/100 g-$H_2O$ or more is preferable, from the viewpoint of interaction with the solid phase. Such component includes saccharides and the like. Among the saccharides, saccharides are preferable. Also, as the component having a carboxyl group or an amino group, at least one selected from amine compounds, amino acids, and organic acids is preferable, from the viewpoint of interaction with the solid phase. Moreover, as the organic acid, among those described above, a component having a solubility in water of 0.001 g/100 g-$H_2O$ or more is preferable, and 1 g/100 g-$H_2O$ or more is more preferable. Examples of the organic acid having good water solubility include short chain fatty acids, hydroxy acids, divalent or more valent carboxylic acids, and the like.

In the case of such combination, the carboxyl group releases hydrogen ions and has a negative charge, and the amino group has a strong basicity due to an unshared electron pair of the nitrogen atom and coordinates the cation so as to have a positive charge. On the other hand, the alcoholic hydroxyl group has a polarity but the tendency to release hydrogen ions is smaller than that of the carboxyl group, so that the affinity with the polar functional group and the ion-exchangeable functional group in the solid phase is higher in the component having the carboxyl group or the amino group than the component having an alcoholic hydroxyl group. The strength of the interaction of a first solvent with the low concentration component and the high concentration component is adjusted based on the difference in the strength of the interaction of and the solid phase with the low concentration component and the high concentration component, which is mainly due to the charge. With this, it is possible to prepare a first solvent having characteristics of allowing the component at low concentration to be retained in the solid phase and of preventing the component at high concentration from being retained in the solid phase. Similarly, the strength of the interaction of a second solvent with the low concentration component and the high concentration component is adjusted, it is possible to prepare a second solvent having a characteristic of allowing the component at high concentration to be retained.

Such first solvent is preferably a mixed solvent containing a water-soluble organic solvent and water. As such water-soluble organic solvent, at least one selected from acetonitrile, acetone, and methanol is preferable, from the viewpoint of solubility of various components and solubility in water. Further, a weight ratio (A/B) of water-soluble organic solvent (A) to water (B) is preferably 9/1 to 0/1, from the viewpoint of efficiently allowing the low concentration component in the solid phase to be retained but preventing the high concentration component from being retained.

Also, the second solvent is preferably a mixed solvent of the first solvent and a water-soluble organic solvent contained in the first solvent. In this way, the water-soluble organic solvent contained in the first solvent is used, thereby easily adjusting the relationship of the interaction among the second solvent, the low concentration component and the high concentration component, and the solid phase. Moreover, when the first solvent is a mixed solvent containing a water-soluble organic solvent and water as described above, the polarity of the second solvent can be lowered by adding a water-soluble organic solvent to the first solvent. As a result, the high concentration component has stronger interaction with the first solvent than the solid phase, but the interaction with the solid phase becomes stronger than with the second solvent, and the high concentration component can be retained in the solid phase. In addition, the low concentration component is more strongly interacted with the solid phase, the low concentration component retained in the first retaining step is retained as it is in the solid phase, and those supplied in the second retaining step are also retained in the solid phase. The amount of a predetermined water-soluble organic solvent to be added to the first solvent may be such that the high concentration component can be retained in the solid phase, and it is preferable that the weight ratio (A/B) of the water-soluble organic solvent (A) to the water (B) in the second solvent is determined to be 500/1 to 20/1, from the viewpoint of more efficiently retaining the high concentration component.

The solid phase that can be used in this embodiment may be constituted by a carrier having at least one functional group selected from polar functional groups and ion-exchangeable functional groups. The constitution of such solid phase includes those in which carriers having each functional group are randomly mixed in one casing, those in which the carriers are laminated and arranged in one casing, those in which each carrier is arranged in separate casings and connected, and the like. In addition, the carrier includes silica-based carriers, resin-based carriers such as a copolymer of styrene and divinylbenzene, and the like. Among them, a carrier having an ion-exchangeable functional group is preferable, and it is preferable to use a resin-based carrier, and a resin-based carrier having an ion-exchangeable functional group is more preferable, from the viewpoint of more efficiently allowing an amino acid, an organic acid, and a saccharide (more preferably a saccharide) to be retained in the solid phase. In this embodiment, the functional group having polarity means a functional group having an electrical bias within the functional group. In addition, LogPow of the carrier can be used as an indicator for the magnitude of polarity. Also, pKa can be used as an indicator for ionicity.

In a case where the solid phase has an ion-exchangeable functional group, the solid phase may have a plurality of ion-exchangeable functional groups having different charges as the ion-exchangeable functional group, depending on the constitution of the low concentration component. For example, in a case where an organic acid and an amino acid and/or an amine compound are contained as the low concentration component, the organic acid liberates a hydrogen ion of the carboxyl group to have a negative charge, and the amino acid and the amine compound have a hydrogen ion or the like coordinated to an amine group to have a positive charge portion. Therefore, from the viewpoint of surely retaining both, a solid phase constituted by a carrier having an anion-exchangeable functional group and a carrier having a cation-exchangeable functional group is preferable. In addition, the ion-exchangeable functional group is preferably a strong ion-exchangeable functional group, from the viewpoint of more efficiently allowing a component having an alcoholic hydroxyl group and a component having a carboxyl group and/or an amino group, for example, an amine compound, an amino acid, an organic acid, and a saccharide (more preferably a saccharide) to be retained in the solid phase. Moreover, as described later, in the case of performing derivatization of each component retained in the solid phase, it is necessary to remove water. In the case of a carrier having a strong ion-exchangeable functional group, there is also an advantage that it can be constituted to be able to easily remove residual water only by passing through a non-aqueous solvent. Here, strong ion-exchangeable means strong cation-exchangeable or strong anion-exchangeable, strong cation-exchangeable means strongly acidic cation-exchangeable, and strong anion-exchangeable means strongly basic anion-exchangeable.

As the solid phase of this embodiment, a commercially available one can be used. Examples of the solid phase constituted by a carrier having an ion-exchangeable functional group include solid-phase cartridges such as Smart-SPE-PSA, $NH_2$, SAX, SCX, AX, WAX, CX, and WCX manufactured by AiSTI SCIENCE CO., Ltd. Examples of the solid phase constituted by a carrier having a polar functional group include solid-phase cartridges such as Smart-SPE-SI, FL, PLS3, and HLB manufactured by AiSTI SCIENCE CO., Ltd.

The constitution of the solid phase in a case where the high concentration component is a saccharide and the low concentration component is at least one selected from amine compounds, amino acids, and organic acids will be more specifically exemplified. That is, as the low concentration component, seven embodiments of only amine compound, only amino acid, only organic acid, amino acid and organic acid, amine compound and organic acid, amino acid and amine compound, amine compound, amino acid and organic acid are conceivable. In a case where the low concentration component is only an organic acid, the solid phase is preferably constituted by a carrier having an anion-exchangeable functional group. On the other hand, in the case of containing an amino acid and an amine compound, it is preferably constituted by a carrier having an anion-exchangeable functional group and a carrier having a cation-exchangeable functional group. It is because a saccharide and an organic acid have strong tendency to interact with an anion-exchangeable functional group, and an amino acid and an amine compound have strong tendency to interact with a cation-exchangeable functional group.

In this embodiment, in the first washing step, a non-aqueous solvent may be further supplied after the first solvent is supplied to the solid phase. This makes it possible to remove residual water in the solid phase and to prevent variation in the magnitude of polarity of the solvent due to residual water. Such non-aqueous solvent includes water-soluble organic solvents, and more specifically includes acetonitrile, acetone, methanol and the like, from the viewpoint of efficiently removing residual water from the solid phase. Among such water-soluble organic solvents, when derivatization is performed, as described later, those which do not have a hydroxyl group are preferable, and for example, acetonitrile and acetone are more preferable.

In this embodiment, it is preferable to perform a second washing step of supplying a non-aqueous solvent after completion of the second retaining step. This second washing step is particularly suitable in the case of derivatizing the high concentration component and the low concentration component, which are retained in the solid phase, as described later. It is because derivatization is hindered when water exists upon performing derivatization. Such non-aqueous solvent includes water-soluble organic solvents, and more specifically includes acetonitrile, acetone, methanol and the like, from the viewpoint of efficiently removing residual water from the solid phase. Among such water-soluble organic solvents, those which do not have a hydroxyl group are preferable, and for example, acetonitrile and acetone are more preferable, when derivatization is performed as described later.

The component contained in the sample may be, for example, an amine compound, an amino acid, an organic acid, a saccharide (particularly, a saccharide) or the like. In this situation, when these are measured by a gas chromatograph, it is preferable to perform derivatization by a derivatization reagent for enabling the measurement. For the occasion, it is preferable, in the present invention, to derivatize each component in a state of being retained in the solid phase. For example, it is preferable to perform, before the elution step, a derivatization step of supplying a derivatization reagent to the solid phase, derivatizing the component retained in the solid phase, and liberating it from the solid phase. Performing derivatization in this way makes it possible to liberate each derivatized component from the solid phase. Therefore, regardless of the type of interaction between the solid phase and each component before derivatization, it becomes possible to simultaneously extrude the components retained in the solid phase with an extrusion solvent as a derivatized product, in the elution step. As such extrusion solvent, hexane or a mixed solution of acetone and hexane is preferable from the viewpoint of stability of the derivatized product. Also, as a mixed solution of acetone and hexane, a mixing ratio (A/H) on the volume basis of acetone (A) and hexane (H) is preferably 1/1 to 1/9 for the same reason.

For the derivatization in this embodiment, a known method can be adopted, and examples thereof include silylation, acylation, esterification, cyclic derivatization, and the like. For the reagent for performing derivatization of them, a general reagent can be used. Among them, when the low concentration component and the high concentration component are an amine compound, an amino acid, an organic acid or a saccharide, silylation is preferable, and trimethylsilylation is more preferable. Examples of the derivatization reagent for performing trimethylsilylation include N-methyl-N-trimethylsilyltrifluoroacetamide (MSTFA), N,O-bis(trimethylsilyl)trifluoroacetamide (BSTFA), trimethylchlorosilane (TMCS) N,O-bis(trimethylsilyl)acetamide (BSA), N-methyl-N-trimethylsilylacetamide (MTMSA), N-trimethylsilyldimethylamine (TMSDMA), N-trimethylsilyldiethylamine (TMSDEA), N-trimethylsilylimidazole (TMSI), and the like. These may be used singly or in combination of two or more kinds. Among them, it is preferable to contain at least one selected from MSTFA, BSTFA, and TMCS, and more preferable to contain MSTFA or MSTFA and TMCS, from the viewpoint of efficient trimethylsilylation of an amino acid, an organic acid, and a saccharide. Also, when MSTFA and TMCS are contained, a ratio (molar ratio) of MSTFA to TMCS is preferably 0.5 to 20% of TMCS with respect to MSTFA, from the viewpoint of efficiently performing trimethylsilylation.

In addition, the derivatization reagent may contain pyridine, from the viewpoint of more efficient trimethylsilylation of an amine compound, an amino acid, an organic acid, and a saccharide. It is presumed that pyridine has a function as a catalyst for trimethylsilylation.

In this embodiment, the component retained in the solid phase may be subjected to a predetermined treatment before performing derivatization. For example, when exemplifying a case of performing trimethylsilylation, a specific isomer is preferentially produced among components that generate plural isomers and the like when trimethylsilylated. With this, the measurement accuracy of such components can be improved. Examples of such treatment include a method of reacting with a predetermined reagent to react with a component retained in a solid phase before reacting a derivatization reagent with each component, and the like. For such a case, both of the derivatization reagent and the predetermined reagent may be supplied to the solid phase at the same time, or the derivatization reagent may be supplied later. As an active ingredient of such predetermined reagent, for example, it is preferable to contain a compound containing nitrogen, and more preferable to contain an amine compound. As such amine compound, alkoxyamines and salts thereof (including hydrochloride) and the like are preferable. Examples of the alkoxyamines and salts thereof (including hydrochloride) include methoxyamine and salts thereof (including hydrochloride) (hereinafter referred to as "methoxyamine and the like") and others. The methoxyamine and the like are preferably used as a solution in which a nitrogen-containing compound such as pyridine, acetonitrile, acetone, chloroform, or dichloromethane can be dissolved in a solvent. Incidentally, the treatment performed using such reagent containing methoxyamine and the like is referred to as methoximation.

The use amounts of the sample, the solid phase and the solvent and the like in this embodiment can be appropriately determined according to the required amount of the analytical sample to be used for the measurement performed after the pre-analysis treatment.

Second Embodiment

In a second embodiment, a component at low concentration has a charge bias smaller than that of a component at high concentration, a solid phase is constituted by a carrier having a nonpolar functional group, a first solvent has a polarity that allows the component at low concentration to be retained in the solid phase and prevents the component at high concentration from being retained in the solid phase. In addition, a second solvent is a mixed solvent of the first solvent and a solvent having a polarity higher than that of the first solvent, and has a polarity that allows the component at low concentration and the component at high concentration to be retained in the solid phase, and an extrusion solvent has a polarity lower than that of the first solvent. Also in this case, a pre-analysis treatment is performed with the above step, and thus items specific to this embodiment will be described below.

As described above, in this embodiment, attention is paid to the charge bias of the low concentration component and the high concentration component, and the relationship among polarities of the solid phase, the first solvent, the second solvent, and the extrusion solvent, thereby enabling greatly different concentrations of a plurality of components contained in the sample to be individually adjusted to predetermined ranges. In this embodiment, the relationship between the charge bias of the low concentration component and the high concentration component is such that the low concentration component has a charge bias smaller than that of the high concentration component. In addition, since the solid phase is constituted by a carrier having a nonpolar functional group, the low concentration component also has a charge bias so that it can be extruded from the solid phase with an extrusion solvent whose polarity is adjusted. In this embodiment, the charge bias of the low concentration component and the high concentration component means a polarity in the molecule or a charge of ions contained in the molecule.

In this embodiment, as described above, the first solvent has a polarity that allows the component at low concentration to be retained in the solid phase and prevents the component at high concentration from being retained in the solid phase. In addition, the solid phase is constituted by a carrier having a nonpolar functional group and the charge bias of the low concentration component is smaller than that of the high concentration component. Accordingly, the interaction with the solid phase becomes larger in the low concentration component than the high concentration component. The polarity of the first solvent may be adjusted by using the difference in interaction based on the charge bias. That is, the polarity of the first solvent may be adjusted so as to have the polarity between the charge bias of the low concentration component and the charge bias of the high concentration component. Also, the polarity of the first solvent can be adjusted by mixing solvents having different polarities. The solvent to be mixed can be selected based on the charge bias of the low concentration component and the high concentration component.

The second solvent is a mixed solvent of a first solvent and a solvent having a polarity larger than that of the first solvent. Such a mixed solvent is used, thereby allowing the polarity of the second solvent to be larger than that of the first solvent. Then, the polarity of the second solvent is increased so that the interaction between the solid phase and the high concentration component s larger than the interaction between the second solvent and the high concentration component, in a relationship with a carrier having a nonpolar functional group of the solid phase. Accordingly, the high concentration component is retained in the solid phase. In this case, since the low concentration component has a charge bias smaller than that of the high concentration component, the interaction with solid phase is larger than with the second solvent. Therefore, the low concentration component is also retained in the solid phase.

For the extrusion solvent, a solvent having a polarity lower than that of the first solvent is used. However, in order to elute the low concentration component and the high concentration component from the solid phase, a solvent having a larger interaction with the low concentration component and the high concentration component than the solid phase is selected, in the relationship with a carrier having a nonpolar functional group of the solid phase.

The low concentration component and the high concentration component, the solid phase, the first solvent, the second solvent, and the extrusion solvent in this embodiment can be combined as described above, according to the types of the low concentration component and the high concentration component. Here, the first solvent preferably contains a water-soluble organic solvent. It is because the water-soluble organic solvent generally has polarity and is suitable for adjusting the polarity of the first solvent. The same applies to the second solvent and the elution solvent. As such water-soluble organic solvent, at least one selected from acetonitrile, acetone, and methanol is preferable. Also, as the elution solvent, a water-soluble organic solvent different from the first and second solvents may be used. Hereinbelow, a sample containing monoglyceride as a high concentration component and cholesterol as a low concentration component will be briefly described.

Monoglyceride is an ester of one hydroxyl group of glycerin and a fatty acid and has two hydroxyl groups. Cholesterol has a hydroxyl group at the 3-position of an A ring of cholestane, and cholesterol which is a low concentration component has a smaller charge bias, i.e., polarity. In this case, it is preferable to use a mixed solvent of a water-soluble organic solvent and water as the first solvent, and a weight ratio (A/B) of the water-soluble organic solvent (A) to water (B) at this time is preferably from 90/10 to 75/25. Preferred water-soluble organic solvents are as described above. A weight ratio (A/B) of the second solvent is preferably from 60/40 to 40/60. The elution solvent is not particularly limited as long as it has a polarity lower than that of the first solvent, and examples thereof include hexane, acetone, a mixed solution of hexane and acetone, and the like. The solid phase may be constituted by a carrier having a nonpolar functional group, and a commercially available solid-phase cartridge or the like can be used. Examples thereof include Smart-SPE C18 manufactured by AiSTI SCIENCE CO., Ltd.

Third Embodiment

In a third embodiment, a component at low concentration has a charge bias larger than that of a component at high concentration. A solid phase is constituted by a carrier having a polar functional group. A first solvent has a polarity that allows the component at low concentration to be retained in the solid phase and prevents the component at high concentration from being retained in the solid phase. A second solvent is a mixed solvent of the first solvent and a solvent having a polarity lower than that of the first solvent and has a polarity that allows the component at low concentration and the component at high concentration to be retained in the solid phase. An extrusion solvent has a polarity higher than that of the first solvent. Also in this case, a pre-analysis treatment is performed by the above step, and thus items specific to this embodiment will be described below.

As described above, also in this embodiment, attention is paid to the charge bias of the low concentration component and the high concentration component, and the relationship among polarities of the solid phase, the first solvent, the second solvent, and the extrusion solvent, thereby enabling greatly different concentrations of a plurality of components contained in the sample to be individually adjusted to predetermined ranges. In this embodiment, the relationship between the charge bias of the low concentration component and the high concentration component is such that the low concentration component has a charge bias larger than that of the high concentration component. Also in this embodiment, the charge bias of the low concentration component and the high concentration component means a polarity in the molecule or a charge of ions contained in the molecule.

In this embodiment, as in the second embodiment, the first solvent has a polarity that allows the component at low concentration to be retained in the solid phase and prevents the component at high concentration from being retained in the solid phase. Here, unlike the second embodiment, the solid phase is constituted by a carrier having a polar functional group. In addition, since the solid phase is constituted by a carrier having a polar functional group and the charge bias of the low concentration component is larger than that of the high concentration component, the interaction with the solid phase becomes larger in the low concentration component than the high concentration component. The polarity of the first solvent may be adjusted by using the difference in the interaction based on the charge bias. That is, the polarity of the first solvent may be adjusted so as to have the polarity between the charge bias of the low concentration component and the charge bias of the high concentration component. Also in this embodiment, the polarity of the first solvent can be adjusted by mixing solvents having different polarities. The solvent to be mixed can be selected based on the charge bias of the low concentration component and the high concentration component.

The second solvent is a mixed solvent of a first solvent and a solvent having a polarity smaller than that of the first solvent. Such a mixed solvent is used, thereby allowing the polarity of the second solvent to be smaller than that of the first solvent. Then, the polarity of the second solvent is decreased so that the interaction between the solid phase and the high concentration component is larger than the interaction between the second solvent and the high concentration component, in a relationship with a carrier having a polar functional group of the solid phase. Accordingly, the high concentration component is retained in the solid phase. In this case, since the low concentration component has a charge bias larger than that of the high concentration component, the interaction with the solid phase is larger than with the second solvent. Therefore, the low concentration component is also retained in the solid phase.

For the extrusion solvent, a solvent having a polarity higher than that of the first solvent is used. However, in order to elute the low concentration component and the high concentration component from the solid phase, a solvent having a larger interaction with the low concentration component and the high concentration component than the solid phase is selected, in the relationship with a carrier having a polar functional group of the solid phase.

The low concentration component and the high concentration component, the solid phase, the first solvent, the second solvent, and the extrusion solvent in this embodiment can be combined as described above, according to the types of the low concentration component and the high concentration component. In this case, the first solvent preferably contains a water-soluble organic solvent, from the viewpoint of adjusting the polarity of the first solvent. As such water-soluble organic solvent, at least one selected from acetonitrile, acetone, and methanol is preferable. Hereinbelow, a sample containing monoglyceride as a high concentration component and catechin as a low concentration component will be briefly described.

Monoglyceride is an ester of one hydroxyl group of glycerin and a fatty acid and has two hydroxyl groups, and catechin has a structure in which hydrogens in the basic skeleton of flavan are substituted with four hydroxyl groups, thus the charge bias becomes larger in the low concentration component. In this case, it is preferable to use a mixed solvent of a water-soluble organic solvent and a water-insoluble organic solvent as the first solvent. Such water-insoluble organic solvent includes hexane and the like. In this case, a weight ratio (A/C) of the water-soluble organic solvent (A) to the water-insoluble organic solvent (C) is preferably from 25/75 to 20/80. Preferred water-soluble organic solvents are as described above. The weight ratio (A/C) of the second solvent is preferably 10/90 to 1/99. The elution solvent is not particularly limited as long as it has a polarity higher than that of the first solvent, and examples thereof include acetone, a mixed solution of hexane and acetone, and the like. Also, as a mixed solution of acetone and hexane, a mixing ratio (A/H) on the volume basis of acetone (A) and hexane (H) is preferably 100/0 to 50/50. The solid phase may be constituted by a carrier having a polar functional group, and a commercially available solid-phase cartridge or the like can be used. Examples thereof include Smart-SPE NH2 and PSA manufactured by AiSTI SCIENCE CO., Ltd.

<Second Pre-Analysis Treatment Method>

The second pre-analysis treatment method (hereinafter sometimes referred to as "second method") is different from the first method in that the second retaining step includes a capturing step of supplying the sample in a smaller amount than the predetermined amount supplied in the first retaining step and a volume larger than 0% and 25% or less of the apparent volume of the solid phase to the solid phase after the first washing step, and allowing a sample containing a component at relatively high concentration to be captured to the solid phase, a drying step of supplying gas to the solid phase after the capturing step and removing volatile components to dry the solid phase, and a second washing step of supplying a second solvent to the solid phase after the drying step to remove contaminants.

The second method is for obtaining an analytical sample in which greatly different concentrations of a plurality of components contained in a sample are individually adjusted to predetermined ranges. Then, this pre-analysis treatment method includes a first retaining step of supplying each predetermined amount of a sample containing a plurality of components with greatly different concentrations and a first solvent to a solid phase, and allowing a component at relatively low concentration to be retained in the solid phase, a first washing step of further supplying the first solvent to the solid phase and removing a component at relatively high concentration from the solid phase, a capturing step of supplying the sample in a smaller amount than the predetermined amount supplied in the first retaining step and a volume larger than 0% and 25% or less of the apparent volume of the solid phase to the solid phase after the first washing step, and allowing a sample containing a component at relatively high concentration to be captured to the solid phase, a drying step of supplying gas to the solid phase after the capturing step and removing volatile components to dry the solid phase, and a second washing step of supplying a second solvent to the solid phase after the drying step to remove contaminants, and an elution step of simultaneously extruding the components retained in the solid phase with an extrusion solvent to obtain an analytical sample. Here, the first solvent used at this time is capable of dissolving the component at relatively low concentration and the component at relatively high concentration, and has characteristics of allowing the component at low concentration to be retained in the solid phase and preventing the component at high concentration from being retained. In addition, the second solvent has a characteristic of allowing the component at low concentration and the component at high concentration to be retained in the solid phase.

Also in the second method, firstly, a sample to be analyzed containing the component at low concentration (hereinafter also referred to as "low concentration component") and the component at high concentration (hereinafter also referred to as "high concentration component") and the first solvent are supplied to the solid phase, and the high concentration component is not retained in the solid phase and only the low concentration component is retained in the solid phase. Thereafter, the same sample to be analyzed is again supplied to the solid phase in a smaller amount than the previous supply time so as to have a volume larger than 0% and 25% or less of the apparent volume of the solid phase, a sample containing the low concentration component and the high concentration component is captured to the solid phase, and the low concentration component and the high concentration component are retained in the solid phase through a drying step and a second washing step. In this way, the supply amount of the sample at the time of retaining the high concentration component in the solid phase is reduced to be smaller than the time when only the low concentration component is retained in the solid phase, thereby reducing the amount of the high concentration component retained in the solid phase. Therefore, it becomes possible to adjust the amount of the low concentration component and the amount of the high concentration component retained to the solid phase to predetermined ranges. Further, the concentrations of each component contained in the sample can be calculated based on the supply amount in this case. Therefore, in a measurement performed after the pretreatment, it is possible to simultaneously measure a plurality of components contained in the sample, with greatly different concentrations, to be analyzed using a pretreated sample. In addition, the retaining amount of the high concentration component is decreased. Accordingly, even when the retention times of the gas chromatogram are, for example, close to each other in the measurement performed after the pretreatment, the effect on the low concentration component by the high concentration component can be reduced, which makes it possible to measure more components. Moreover, it is possible to avoid a situation where a high concentration component is introduced in large quantities into a separation column of a chromatograph, and multi-component measurement such as metabolome analysis can be stably performed.

Hereinbelow, specific details to the second method will be mainly described. The first retaining step is the same as in the first method.

After the first retaining step, a first washing step is performed. In the first washing step, the first solvent is further supplied to the solid phase, and the component at relatively high concentration is removed from the solid phase. In this way, a remaining high concentration component that is not retained in the solid phase during the first retaining step is removed from the solid phase, thereby allowing only the low concentration component to exist in the solid phase. Whereby, only the high concentration component that is captured to the solid phase in the capturing step, undergone the drying step and retained in the solid phase in the second washing step can be allowed to exist in the analytical sample to be obtained.

In the first washing step, it is preferable to supply gas after supplying the first solvent to the solid phase. This makes it possible to surely discharge the first solvent from the solid phase, thus it is possible to surely capture the sample by the solid phase in the capturing step. In addition, volatile components can be more surely removed from the solid phase while capturing nonvolatile components to the solid phase in the drying step. Examples of the gas usable in the first washing step include air, oxygen, inert gas, and the like. Examples of the inert gas include carbon dioxide, nitrogen, and rare gas, and the like. The supply conditions of the gas to the solid phase are not particularly limited as long as it can remove the first solvent. For example, the supply condition to the solid phase is 2 to 30 seconds at a supply speed of $10^3$ to $10^4$ times volume/min with respect to the apparent volume of the solid phase, under an atmosphere of 20 to 40° C.

After the first washing step, the capturing step is performed. In the capturing step, the sample in an amount smaller than the predetermined amount supplied in the first retaining step and having a volume larger than 0% and 25% or less of the apparent volume of the solid phase is further supplied to the solid phase after the first washing step, and a sample containing a component at relatively high concentration is captured to the solid phase. In this way, when supplying a small amount of a sample so as to have a volume in a predetermined range with respect to the apparent volume of the solid phase, the sample supplied to the solid phase remains as it is. Thus, unlike in the case of the first retaining step, it is not necessary to consider the interaction among the high concentration component, the low concentration component, the solid phase, and the solvent. In addition, in the present invention, the volume to be supplied to the solid phase in the capturing step is extremely small, and the drying step is performed after the capturing step, thus volatile components such as the solvent are volatilized and removed by supplying gas, and nonvolatile components such as the high concentration component, the low concentration component, and contaminants can be remained in the solid phase.

At this time, as an embodiment of the sample to be supplied to the solid phase, it is not particularly limited as long as it has a volume smaller than the predetermined amount supplied in the first retaining step and a volume larger than 0% and 25% or less of the apparent volume of the solid phase. For example, in the case of a liquid sample or a diluted solution thereof, the sample may be used as it is to make the supply amount itself small, so that the supply amount of the high concentration component is smaller than that in the first retaining step. Alternatively, in the case of a diluted solution obtained by diluting the liquid sample, the dilution ratio may be made larger than that in the first retaining step so that the supply amount of concentration component is smaller than that in the first retaining step.

As mentioned above, in the capturing step, a predetermined amount of the sample is supplied to the solid phase. Here, a predetermined amount of the solvent may be supplied in addition to the predetermined amount of the sample. Although examples of embodiments of supplying the solvent include the same embodiment as described in the first retaining step, it is preferable to supply the solvent simultaneously with the sample as a diluted solution of the sample diluted with a solvent, as described above. The solvent usable in the capturing step is not particularly limited as long as it can dissolve the low concentration component and the high concentration component. When the sample is supplied as a diluted solution, it is preferable to use the same one as in the first retaining step, and the first solvent can be used, from the viewpoint of simplicity of operation.

A drying step is performed after the capturing step. In the drying step, gas is supplied to the solid phase and volatile components supplied to the solid phase in the capturing step and contained in a small amount of a remaining sample are volatilized and removed. Examples of the gas usable in the drying step include air, oxygen, inert gas, and the like. Among them, inert gas such as carbon dioxide, nitrogen, and rare gas is preferable. In addition, when water is contained in the solvent, the gas that underwent the drying treatment may be used, from the viewpoint of efficiency of water removal. The supply conditions of the gas to the solid phase are not particularly limited as long as it can remove the volatile components. For example, the supply condition to the solid phase is 10 to 60 seconds at a supply speed of $10^4$ to $10^5$ times volume/min with respect to the apparent volume of the solid phase, under an atmosphere of 20 to 40° C.

After the drying step, in order to remove contaminants not removed in the drying step, a second washing step of supplying the second solvent to the solid phase is performed. The second solvent to be used here has a characteristic of allowing the low concentration component and the high concentration component to be captured in the solid phase. This makes it possible to remove contaminants from the solid phase while retaining the low concentration and high concentration components captured to the solid phase in the capturing step in the solid phase by interaction with the solid phase, and also retaining the low concentration component retained in the first retaining step in the solid phase. Such washing solvent can be determined in consideration of the relationship of interaction among the solid phase and the low concentration component and the high concentration component. More specific embodiment will be described later. As will be described later, when performing derivatization of the components retained in the solid phase, it is preferable to use a non-aqueous solvent.

After the second washing step, an elution step, and as necessary, a constant volume step are performed, as in the first method.

Hereinafter, the embodiment of the second method will be described in more detail according to the high concentration component and the low concentration component contained in the sample to be analyzed. Here, the second method is not limited to these embodiments, and can be carried out in various forms without departing from the scope of the present invention, as a matter of course.

Fourth Embodiment

In a fourth embodiment, as in the first embodiment, a sample contains a component having an alcoholic hydroxyl group as a component at relatively high concentration and a component having a carboxyl group or an amino group as a component at relatively low concentration, and a solid phase is constituted by a carrier having at least one functional group selected from polar functional groups and ion-exchangeable functional groups. That is, the fourth embodiment is an embodiment in which a low concentration component has a charge bias, which is larger than that of a high concentration component by containing an ionic functional group as the low concentration component and a polar functional group as the high concentration component in the sample. Also in this case, the pre-analysis treatment is performed by the above step, and thus the specific details to this embodiment will be described below.

Also in this embodiment, the component having an alcoholic hydroxyl group, the component having a carboxyl group or an amino group, preparation of a first solvent and a second solvent, and the solid phase are the same as those in the first embodiment.

In this embodiment, in the first washing step, it is preferable to supply gas after supplying the first solvent. As described above, gas is supplied in this way, thereby surely discharging the first solvent from the solid phase. With this the sample can be surely captured by the solid phase in the capturing step. In addition, volatile components can be more surely removed from the solid phase while capturing nonvolatile components to the solid phase in the drying step. The gas usable in the first washing step and the supply conditions are as described above.

In this embodiment, after the first washing step, the capturing step is performed. In the first washing step, it is preferable to use a first solvent containing water as described above. However, water may remain in the solid phase. In such a situation, if a sample is supplied to retain the high concentration component in the solid phase, the interaction between the high concentration component and the solid phase is affected by the influence of the polarity by water. With this, retention of the high concentration component to the solid phase tends to become unstable. However, in the present invention, since the capturing step and the drying step are performed, it is unnecessary to take into consideration the interaction between the solid phase and the high concentration component in the capturing step, water may be removed in the drying step, and the high concentration component may be retained in the solid phase by the interaction between the solid phase and the high concentration component in the second washing step. Further, as described later, when the high concentration component and the low concentration component retained in the solid phase are derivatized, the drying step is effective in that water can also be removed. It is because water hinders derivatization. Here, the gas usable in the drying step and the supply conditions of the gas in this embodiment are as described above.

In this embodiment, after completion of the drying step, a second washing step of supplying a second solvent to the solid phase is performed in order to remove residual contaminants in the solid phase after the drying step. As the second solvent, a solvent capable of allowing the low concentration component and the high concentration component to be retained in the solid phase is used. Such second solvent to be used may have a smaller interaction with the low concentration component and the high concentration component than the solid phase. Examples of the second solvent include a mixed solvent of the first solvent and the water-soluble organic solvent contained in the first solvent, a non-aqueous solvent, and the like. The non-aqueous solvent is suitable for performing derivatization as described later. Examples of the non-aqueous solvent include water-soluble organic solvents, and more specifically include acetonitrile, acetone, methanol, and others. Among such water-soluble organic solvents, in the case of performing derivatization as described later, those which do not have a hydroxyl group are preferable, and for example, acetonitrile and acetone are more preferable. A water-soluble organic solvent is used, thereby supplementally removing water even when water slightly remains in the drying step.

When the component contained in the sample is, for example, an amino compound, an amino acid, an organic acid, a saccharide, or the like, as in the case of the first embodiment, it is preferable to perform derivatization, and as necessary, pretreatment thereof (for example, trimethylsilylation and the like).

The use amounts and other conditions of the sample, the solid phase, and the solvent in this embodiment can be appropriately determined according to the required amount of the analytical sample to be used for the measurement performed after the pre-analysis treatment.

Fifth Embodiment

In the fifth embodiment, as in the second embodiment, a component at low concentration has a charge bias smaller than that of a component at high concentration, a solid phase is constituted by a carrier having a nonpolar functional group, a first solvent has a polarity that allows the component at low concentration to be retained in the solid phase and prevents the component at high concentration from being retained in the solid phase, a second solvent is a mixed solvent of the first solvent and a solvent having a polarity higher than that of the first solvent and has a polarity that allows the component at low concentration and the component at high concentration to be retained in the solid phase, and an extrusion solvent has a polarity lower than that of the first solvent.

Also in this embodiment, the first solvent, the second solvent, the extrusion solvent, and the solid phase can be selected in the same manner as in the case of the second embodiment, and preferable conditions are also the same. Specific examples thereof include, as in the second embodiment, pretreatment of a sample containing monoglyceride as a high concentration component and cholesterol as a low concentration component. Also in this case, as in the second embodiment, the first solvent, the second solvent, the extrusion solvent, and the solid phase can be selected. The preferred conditions thereof are also the same.

Also in this embodiment, as described above, in the first washing step, it is preferable to supply gas after supplying the first solvent. The gas usable in the first washing step and the supply conditions of the gas are as described above. Also, the gas usable in the drying step and the supply conditions of the gas in this embodiment are also as described above.

Sixth Embodiment

In the sixth embodiment, as in the third embodiment, a component at low concentration has a charge bias larger than that of a component at high concentration, a solid phase is constituted by a carrier having a polar functional group, a first solvent has a polarity that allows the component at low concentration to be retained in the solid phase and prevents the component at high concentration from being retained in the solid phase, a second solvent is a mixed solvent of the first solvent and a solvent having a polarity lower than that of the first solvent and has a polarity that allows the component at low concentration and the component at high concentration to be retained in the solid phase, and an extrusion solvent has a polarity higher than that of the first solvent.

Also in this embodiment, the first solvent, the second solvent, the extrusion solvent, and the solid phase can be selected in the same manner as in the case of the third embodiment, and preferable conditions are also the same. Specific examples thereof include, as in the third embodiment, pretreatment of a sample containing monoglyceride as a high concentration component and catechin as a low concentration component. Also in this case, as in the third embodiment, the first solvent, the second solvent, the extrusion solvent, and the solid phase can be selected. The preferred conditions thereof are also the same.

Also in this embodiment, as described above, it is preferable to supply gas after supplying the first solvent, in the first washing step. The gas usable in the first washing step and the supply conditions of the gas are as described above. Also, the gas usable in the drying step and the supply conditions of the gas in this embodiment are also as described above.

[Analysis Method]

An embodiment of the analysis method according to the present invention is only required to include a step of simultaneously measuring a plurality of components contained in a sample, with greatly different concentrations, for example, using analytical samples obtained by various pre-analysis treatment methods as described above. The embodiment includes an analysis method including step 1 of obtaining an analytical sample by a pre-analysis treatment method and step 2 of simultaneously measuring a plurality of components contained in a sample, with greatly different concentrations, using the obtained analytical sample. The embodiment includes the analysis method in which the step 1 and the step 2 are consecutively and immediately performed, an analysis method in which the analytical sample is temporarily stored after performing step 1, and then step 2 is performed, and other analysis methods.

The method of measuring a component is not particularly limited, and includes gas chromatography mass spectrometry, liquid chromatography mass spectrometry and the like. Further, in the analysis method of the present invention, it is preferable to include an analysis step of conducting analysis based on the measurement result. Such analysis can be performed with, for example, an electronic calculator provided in a chromatography mass spectrometer, and the like.

The pre-analysis treatment method as described above is performed, thereby easily obtaining an analytical sample whose concentrations are adjusted to predetermined ranges, from the sample containing a plurality of components with greatly different concentrations. Therefore, this analytical sample is used as it is, thereby simultaneously measuring a plurality of components contained in the sample, with greatly different concentrations, by using a gas chromatography mass spectrometer and the like. Further, a plurality of components contained in the sample, with greatly different concentrations can be simultaneously analyzed, thereby enabling relative variations of each desired component and the like to be easily simultaneously analyzed.

EXAMPLES

Example 1

<Pre-Analysis Treatment>

As the sample to be analyzed, vegetable juice was used.

MSTFA was used as a derivatization reagent for trimethylsilylation. Methoxy amine was used as a reagent for methoximation.

As a solid phase, a solid-phase cartridge (AiSTI-SPE ACX, manufactured by AiSTI SCIENCE CO., Ltd.) constituted by a carrier having a strong cation-exchangeable functional group and a carrier having a strong anion-exchangeable functional group was used.

10 μL of vegetable juice as a sample to be analyzed, 190 μL of distilled water, and 800 μL of acetonitrile were mixed and warmed at 37° C. for 30 minutes, then centrifuged at 14000 rpm for 5 minutes. The resulting supernatant was used as a sample extraction solution. This sample extraction solution (supernatant) is a solution in which components to be analyzed are dissolved in a water-acetonitrile solution containing approximately 20 vol % of water. The components to be analyzed in the sample extraction solution are amino acids, organic acids, and saccharides, and it is known that high concentration components are saccharides and low concentration components are amino acids and organic acids. It has been confirmed in advance that the water-acetonitrile solution containing 20 vol % of water is capable of dissolving amino acids and organic acids and saccharides, and has characteristics of allowing amino acids and organic acids to be retained in the solid phase and preventing saccharides from being retained. Therefore, the water-acetonitrile solution containing 20 vol % of water functions as the first solvent.

100 μL of the resulting sample extraction solution (corresponding to approximately 1 μL as a sample to be analyzed) was supplied to the solid-phase cartridge. That is, each predetermined amount of the sample to be analyzed and the first solvent were supplied to the solid phase. Whereby, the amino acid is retained in a carrier having a strong cation-exchangeable functional group, and the organic acid is retained in a carrier having a strong anion-exchangeable functional group, by an ion exchange interaction (first retaining step).

An additional 50 μL of a water-acetonitrile solution (first solvent containing 20 vol % of water was supplied to the solid-phase cartridge to remove components not retained in the solid phase, particularly saccharides. Further, 100 μL of acetonitrile was supplied as a non-aqueous solvent to remove residual water in the solid phase (first washing step).

5 μL of the previously obtained sample extraction solution (supernatant) was mixed with 100 μL of acetonitrile to obtain a mixed solution. In this mixed solution, components to be analyzed are dissolved in a water-acetonitrile solution containing approximately 1.0 vol % of water. Also, the amount of the sample extraction solution used is 5/100 of that in the first retaining step. It has been confirmed in advance that the water-acetonitrile solution containing 1.0 vol % of water has a characteristic of allowing amino acids, organic acids, and saccharides to be retained. Therefore, the water-acetonitrile solution containing 1.0 vol % of water functions as the second solvent. 105 μL of this mixed solution (corresponding to approximately 0.05 μL as a sample to be analyzed) was supplied to the solid phase after completion of the first washing step, that is, the sample to be analyzed in a smaller amount than the predetermined amount supplied in the first retaining step and the second solvent were further supplied to the solid phase after the first washing step. Whereby, the amino acid is retained in a carrier having a strong cation-exchangeable functional group, and the organic acid and the saccharide are retained in a carrier having a strong anion-exchangeable functional group (second retaining step).

After completion of the second retaining step, 100 μL of acetonitrile as a non-aqueous solvent was supplied to remove components and water not retained in the solid phase (second washing step).

After completion of the second washing step, 5 μL of methoxyamine and 25 μL of MSTFA were supplied to the solid phase and reacted with the components retained in the solid phase to perform methoximation and trimethylsilylation. Whereby, the derivatized product of the component retained in the solid phase is liberated from the solid phase (derivatization step).

After completion of the derivatization step, 100 μL of hexane was supplied as an extrusion solvent to the solid phase, and the derivatized saccharide, amino acid, and organic acid were simultaneously extruded from the solid phase to obtain an analytical sample (extrusion step).

After completion of the extrusion step, 400 μL of hexane as an extrusion solvent was added to the analytical sample, and the volume was adjusted to constant volume (constant volume step). The analytical sample adjusted to constant volume was used as a measurement sample to be described later.

<Measurement of Components>

Using 10 μL of the measurement sample obtained in the pre-analysis treatment, a measurement was performed using a gas chromatography mass spectrometer. The measurement conditions at this time were as follows. A chromatogram of this measurement is shown in FIG. 1. This chromatogram reflects the amounts of the saccharides contained in 5 μL (corresponding to approximately μ0.05 μL as the sample to be analyzed (vegetable juice)) of the aforementioned sample extraction solution (supernatant), and the amounts of the organic acids and amino acids contained in 105 μL (corresponding to approximately 1.05 μL as the sample to be analyzed (vegetable juice)) of the same sample extraction solution.

[GC-MS Analysis Condition]

PTV Injector: LVI-S250 (AiSTI Science co. Ltd.); Stomach Insert

Injector Temp.: 70° C. (0.4 min)-120° C./min-240° C.-50° C./min-300° C. (15 min)

Auto Sampler: Agilent 7683 (Agilent co. Ltd.); 50 μL Syringe

Injection Volume: 10 μL

GC/MSMS: Agilent 7890B

Column: DB-5 ms, 0.25 mm i.d.×30 m, df; 0.25 μm

Column Oven Temp.: 60° C. (4 min)-20° C./min-310° C. (4 min)

Inlet Mode: Solvent Vent Mode

Vent: 70 kPa, 150 mL/min, 0.1 min

Parge Flow: 50 mL/min, 4 min

Constant Flow: 1.2 mL/min

MS: Agilent 5975C

Detector Temp.: 280° C.

Ion Source Temp.: 250° C.

MS Method: SCAN m/z 50-450

Numbers 1 to 12 in FIG. 1 correspond to trimethylsilylated (TMS) compounds of (1) malic acid, (2) aspartic acid, (3) aminobutyric acid, (4) glutamic acid, (5) phenylalanine, (6) asparagine, (7) citric acid, (8) fructose, (9) fructose, (10) glucose, (11) glucopyranose, and (12) sucrose, respectively. As shown in FIG. 1, the pre-analysis treatment method of the present invention is adopted, thereby measuring the saccharides as high concentration components and the amino acids and the organic acids as low concentration components all at once. Here, each fructose of (9) and (10) is isomer.

Example 2

<Pre-Analysis Treatment>

As the sample to be analyzed, fruit juice was used. For the reagents for trimethylsilylation and methoximation and the solid phase, the same ones as in Example 1 were used.

20 μL of fruit juice as a sample to be analyzed, 180 μL of distilled water, and 800 μL of acetonitrile were mixed and warmed at 37° C. for 30 minutes, then centrifuged at 14000 rpm for 5 minutes. The resulting supernatant was used as a sample extraction solution. In this sample extraction solution (supernatant), components to be analyzed are dissolved in a water-acetonitrile solution containing approximately 20 vol % of water. The components to be analyzed in the sample extraction solution are amino acids, organic acids, and saccharides, and it is known that high concentration components are saccharides and low concentration components are amino acids and organic acids. Also in Example 2, the water-acetonitrile solution containing 20 vol % of water functions as the first solvent.

100 µL (corresponding to approximately 2 µL as a sample to be analyzed) of the resulting sample extraction solution (supernatant) was supplied to the solid-phase cartridge, that is, each predetermined amount of the sample to be analyzed and the first solvent were supplied to the solid phase. Whereby, the amino acid is retained in a carrier having a strong cation-exchangeable functional group, and the organic acid is retained in a carrier having a strong anion-exchangeable functional group, by an ion exchange interaction (first retaining step).

An additional 50 µL of a water-acetonitrile solution (first solvent) containing 20 vol % of water was supplied to the solid-phase cartridge to remove components not retained in the solid phase, particularly saccharides. Further, 100 µL of acetonitrile was supplied as a non-aqueous solvent to remove residual water in the solid phase (first washing step).

1 µL of the previously obtained sample extraction solution (supernatant) was mixed with 100 µL of acetonitrile to obtain a mixed solution. This mixed solution is a solution in which components to be analyzed are dissolved in a water-acetonitrile solution containing approximately 1.0 vol % of water. Also, the amount of the sample extraction solution used is 1/100 of that in the first retaining step. Here, the water-acetonitrile solution containing 1.0 vol % of water functions as the second solvent. 101 µL (corresponding to approximately µ0.02 µL as a sample to be analyzed) of this mixed solution was supplied to the solid phase after completion of the first washing step. That is, the sample to be analyzed in a smaller amount than the predetermined amount supplied in the first retaining step and the second solvent were further supplied to the solid phase after the first washing step. Whereby, the amino acid is retained in a carrier having a strong cation-exchangeable functional group, and the organic acid and the saccharide are retained in a carrier having a strong anion-exchangeable functional group (second retaining step).

After completion of the second retaining step, 100 µL of acetonitrile as a non-aqueous solvent was supplied to remove components and water not retained in the solid phase (second washing step).

After completion of the second washing step, 5 µL of methoxyamine and 25 µL of MSTFA were supplied to the solid phase and reacted with the components retained in the solid phase to perform methoximation and trimethylsilylation. Whereby, the derivatized product of the component retained in the solid phase is liberated from the solid phase (derivatization step).

After completion of the derivatization step, 100 µL of hexane was supplied as an extrusion solvent to the solid phase, and the derivatized saccharide, amino acid, and organic acid were simultaneously extruded from the solid phase to obtain an analytical sample (extrusion step).

After completion of the extrusion step, 400 µL of hexane as an extrusion solvent was added to the analytical sample, and the volume was adjusted to constant volume (constant volume step). The analytical sample adjusted to constant volume was used as a measurement sample.

<Measurement of Components>

Figure 2:
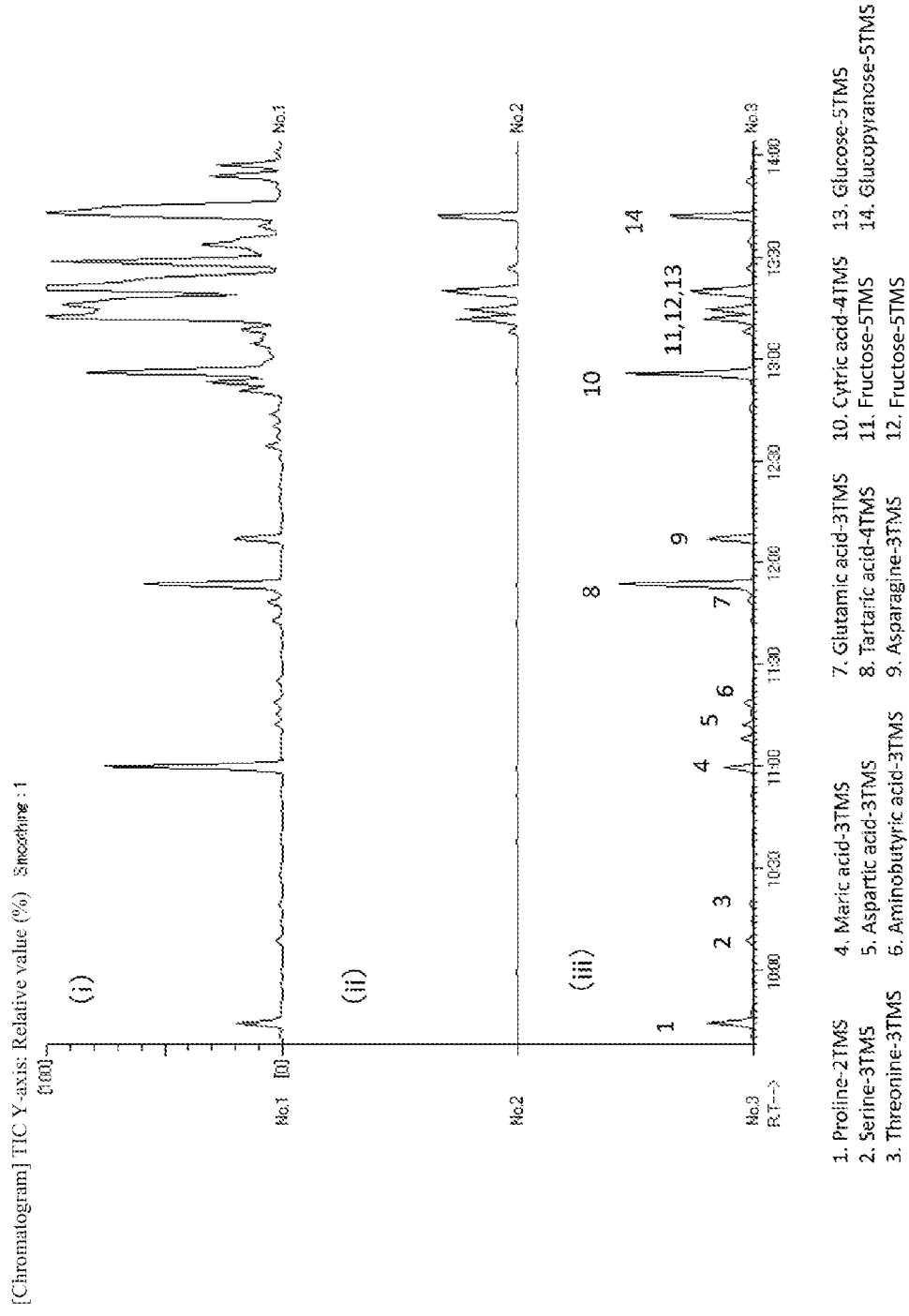
FIG. 2 shows chromatograms of analytical samples that contains trimethylsilylated component and is obtained in Example 2 and Comparative Examples 1 and, 2, by a gas chromatography mass spectrometer, in which (i), (ii), and (iii) in the figure are chromatograms of Comparative Example 1, Comparative Example 2, and Example 2, respectively.
Figure 3:
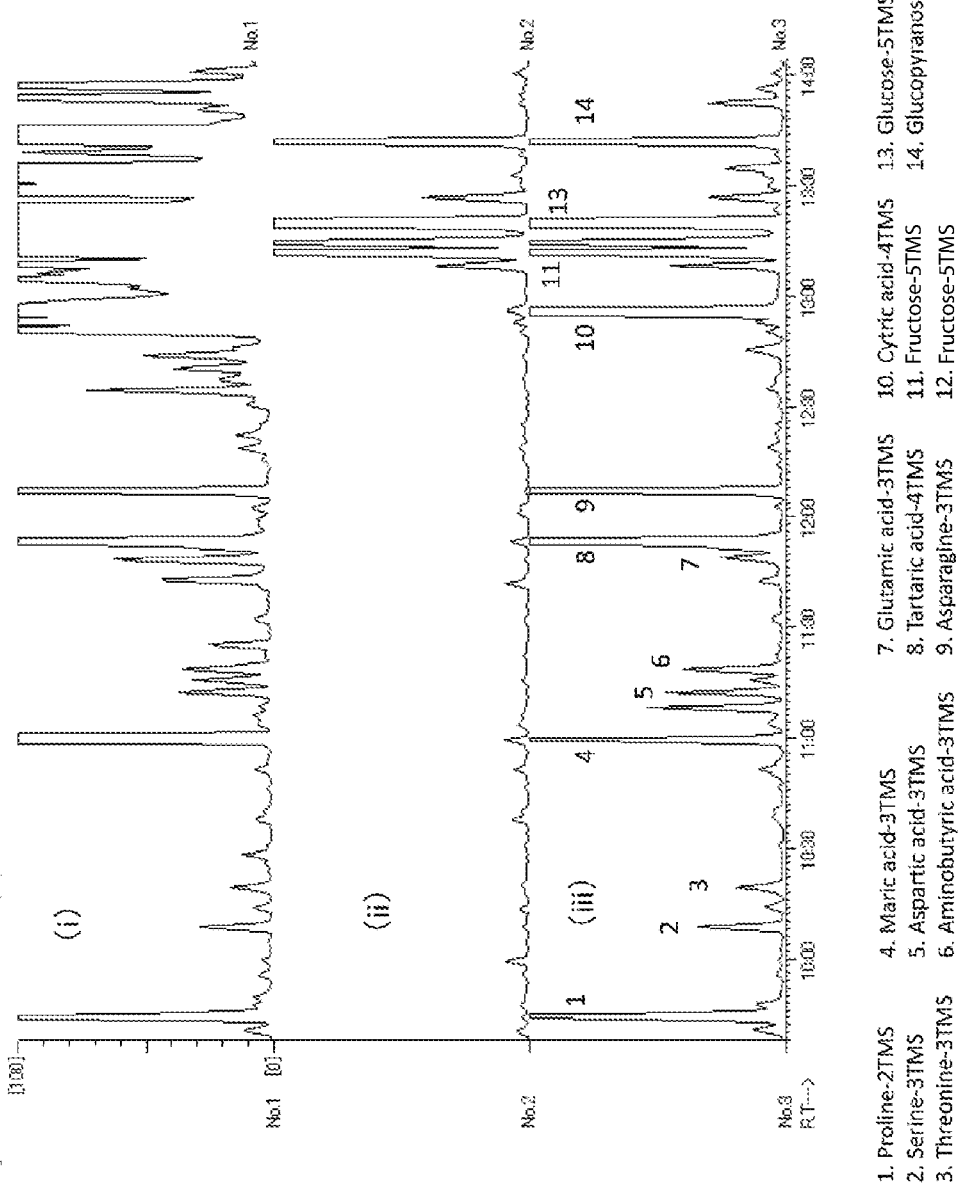
FIG. 3 shows chromatograms obtained by expanding the vertical axis direction in FIG. 2.

Using 10 µL of the measurement sample obtained in the pre-analysis treatment, a measurement was performed using a gas chromatography mass spectrometer, as in Example 1. Chromatograms at this time are shown in FIGS. 2 and 3. This chromatogram reflects the amounts of the saccharides contained in 1 µL (corresponding to approximately 0.02 µL as the sample to be analyzed (fruit juice)) of the aforementioned sample extraction solution supernatant), and the amounts of the organic acid and amino acid contained in 101 µL (corresponding to approximately 2.02 µL as the sample to be analyzed (fruit juice)) of the same sample extraction solution. Incidentally, the chromatograms shown in (iii) of FIGS. 2 and 3 are the result of Example 2.

Numbers 1 to 14 in FIGS. 2 and 3 correspond to trimethylsilylated (TMS) compounds of (1) proline, (2) serine, (3) threonine, (4) malic acid, (5) aspartic acid, (6) aminobutyric acid, (7) glutamic acid, (8) tartaric acid (9) asparagine, (10) citric acid, (11) fructose, (12) fructose, (13) glucose, and (14) glucopyranose, respectively. Here, each fructose of (12) (11) and (12) is isomer.

Comparative Example 1

<Pre-Analysis Treatment>

As the sample to be analyzed, the same fruit juice as in Example 2 was used. As the reagents for trimethylsilylation and methoximation and the solid phase, the same ones as in Example 2 were used.

100 µL of fruit juice as a sample to be analyzed, 100 µL of distilled water, and 800 µL of acetonitrile were mixed and warmed at 37° C. for 30 minutes, then centrifuged at 14000 rpm for 5 minutes. The resulting supernatant was used as a sample extraction solution, 20 µL of the sample extraction solution (supernatant) and 400 µL of acetonitrile were mixed to obtain a diluted solution. Here, the sample extraction solution (supernatant) is a solution in which components to be analyzed are dissolved in a water-acetonitrile solution containing approximately 20 vol % of water. Further, the diluted solution obtained by mixing 20 µL of the sample extraction solution (supernatant) and 400 µL of acetonitrile is a solution in which components to be analyzed are dissolved in a water-acetonitrile solution containing 1.0 vol % of water. 420 µL (corresponding to approximately 2 µL as a sample to be analyzed) of this diluted solution was supplied to the solid phase. Whereby, the amino acid is retained in a carrier having a strong cation-exchangeable functional group, and the organic acid and the saccharide are retained in a carrier having a strong anion-exchangeable functional group.

Thereafter, the same steps as the "second washing step", "derivatization step", "extrusion step", and "constant volume step" in Example 2 were performed to obtain a measurement sample.

<Measurement of Components>

Using 10 µL of the measurement sample obtained in the pre-analysis treatment, a measurement was performed using a gas chromatography mass spectrometer, as in Example 2. Chromatograms at this time are shown in FIGS. 2 and 3. This chromatogram reflects the amounts of the saccharides, organic acids and amino acids contained in 420 µL (corresponding to approximately 2 µL as the sample to be analyzed (fruit juice)) of the sample. Incidentally, the chromatograms shown in (i) of FIGS. 2 and 3 are the result of Comparative Example 1.

Comparative Example 2

<Pre-Analysis Treatment>

As the sample to be analyzed, the same fruit juice as in Example 2 was used. As the reagents for trimethylsilylation and methoximation and the solid phase, the same ones as in Example 2 were used.

20 μL of fruit juice as a sample to be analyzed, 180 μL of distilled water, and 800 μL of acetonitrile were mixed and warmed at 37° C. for 30 minutes, then centrifuged at 14000 rpm for 5 minutes. The resulting supernatant was used as a sample extraction solution. 1 μL of the sample extraction solution (supernatant) and 400 μL of acetonitrile were mixed to obtain a diluted solution. Here, the sample extraction solution (supernatant) is a solution in which components to be analyzed are dissolved in a water-acetonitrile solution containing 20 vol % of water. Further, the solution obtained by mixing 20 μL of the sample extraction solution (supernatant) and 400 μL of acetonitrile is a solution in which components to be analyzed are dissolved in a water-acetonitrile solution containing 1.0 vol % of water. 401 μL (corresponding to approximately 0.02 μL as a sample to be analyzed) of this diluted solution was supplied to the solid phase. Whereby, the amino acid is retained in a carrier having a strong cation-exchangeable functional group, and the organic acid and the saccharide are retained in a carrier having a strong anion-exchangeable functional group.

Thereafter, the same steps as the "second washing step", "derivatization step", "extrusion step", and "constant volume step" in Example 2 were performed to obtain a measurement sample.

<Measurement of Components>

Using 10 μL of the measurement sample obtained in the pre-analysis treatment, a measurement was performed using a gas chromatography mass spectrometer, as in Example 2. Chromatograms at this time are shown in FIGS. 2 and 3. This chromatogram reflects the amounts of the saccharides, organic acids and amino acids contained in 401 μL (corresponding to approximately 0.02 μL as the sample to be analyzed (fruit juice)) of the sample. Incidentally, the chromatograms shown in (ii) of FIGS. 2 and 3 are the result of Comparative Example 2.

As shown in (iii) of FIGS. 2 and 3, the pre-analysis treatment method of the present invention is adopted, thereby enabling the measurement of the saccharides as high concentration components and the amino acids and the organic acids as low concentration components all at once. As shown in (i) of FIGS. 2 and 3, in Comparative Example 1, although amino acids and organic acids as low concentration components can be measured, the peak shapes of portions corresponding to the saccharides are lost and cannot be analyzed due to the presence of saccharides in a large amount. In addition, as shown in (ii) of FIGS. 2 and 3, in Comparative Example 2, although saccharides as high concentration components can be measured, portions corresponding to amino acids and organic acids are too low in concentration, thus detection of peaks is unstable and cannot be analyzed.

Example 3

<Pre-Analysis Treatment>

As the sample to be analyzed, fruit juice was used. MSTFA was used as a derivatization reagent for trimethylsilylation. Methoxyamine/pyridine was used as a reagent for methoximation.

As a solid phase, a solid-phase cartridge (AiSTI-SPE ACX, manufactured by AiSTI SCIENCE CO., Ltd.) constituted by a carrier having a strong cation-exchangeable functional group and a carrier having a strong anion-exchangeable functional group was used. The apparent volume of the carrier portion of the solid-phase cartridge is 10 μL.

20 μL of fruit juice as a sample to be analyzed, 180 μL of distilled water, and 800 μL of acetonitrile were mixed and warmed at 37° C. for 30 minutes, then centrifuged at 14000 rpm for 5 minutes. The resulting supernatant was used as a sample extraction solution. This sample extraction solution (supernatant) is a solution in which components to be analyzed are dissolved in a water-acetonitrile solution containing approximately 20 vol % of water. The components to be analyzed in the sample extraction solution are amino acids, organic acids, and saccharides, and it is known that high concentration components are saccharides and low concentration components are amino acids and organic acids. It has been confirmed in advance that the water-acetonitrile solution containing 20 vol % of water is capable of dissolving amino acids and organic acids and saccharides, and has characteristics of allowing amino acids and organic acids to be retained in the solid phase and not retaining saccharides. Therefore, the water-acetonitrile solution containing 20 vol % of water functions as the first solvent.

100 μL (corresponding to approximately 2 μL it as a sample to be analyzed) of the resulting sample extraction solution (supernatant) was supplied to the solid-phase cartridge. That is, each predetermined amount of the sample to be analyzed and the first solvent were supplied to the solid phase. Whereby, the amino acid is retained in a carrier having a strong cation-exchangeable functional group, and the organic acid is retained in a carrier having a strong anion-exchangeable functional group, by an ion exchange interaction (first retaining step).

An additional 50 μL of a water-acetonitrile solution (first solvent) containing 20 vol % of water was supplied to the solid-phase cartridge to remove components not retained in the solid phase, particularly saccharides. Further, air was supplied to the solid-phase cartridge at 50 mL/min for 5 seconds in an atmosphere at 25° C. to remove the first solvent (first washing step).

1 μL (corresponding to approximately 0.02 μL as a sample to be analyzed. Corresponding to 10% of the apparent volume of the solid phase.) of the sample extraction solution (supernatant) was supplied to the solid phase. That is, the sample to be analyzed in a smaller amount than the predetermined amount supplied in the first retaining step and the first solvent were supplied to the solid phase. Whereby, the sample extraction solution is captured to the solid phase (capturing step). In this example, while the amino acid is retained in a carrier having a strong cation-exchangeable functional group and the organic acid is retained in a carrier having a strong anion-exchangeable functional group, by an ion exchange interaction. The saccharide does not generate interaction with the solid phase in a relationship with the first solvent in the sample extraction solution, but can exist in the solid phase.

After completion of the capturing step, nitrogen is supplied to the solid-phase cartridge at 500 mL/min for 30 seconds in an atmosphere at 25° C. to dry the solid phase (drying step). Whereby, volatile components such as the first solvent are removed, and water contained in the first solvent and the like can also be removed from the solid phase, so that the influence of water in derivatization performed later can be suppressed.

After completion of the drying step, 100 μL of acetonitrile that was a non-aqueous solvent was supplied as the second solvent (second washing step). Whereby, contaminants were removed while allowing amino acids, organic acids, and saccharides to be retained in the solid phase. Incidentally, acetonitrile is a water-soluble organic solvent, thereby removing water by the second solvent, even when little water remains in the drying step.

After completion of the second washing step, 5 μL of a mixed solution of methoxyamine/pyridine was supplied to the solid phase and reacted with the component retained in the solid phase to perform methoximation, then 25 μL of MSTFA was supplied to the solid phase to perform trimethylsilylation of each methoximated component. Whereby, the derivatized product of the component retained in the solid phase is liberated from the solid phase (derivatization step).

After completion of the derivatization step, 100 μL of hexane was supplied as an extrusion solvent to the solid phase, and the derivatized saccharide, amino acid, and organic acid were simultaneously extruded from the solid phase to obtain an analytical sample (extrusion step).

After completion of the extrusion step, 400 μL of hexane as an extrusion solvent was added to the analytical sample, and the volume was adjusted to constant volume (constant volume step). The analytical sample adjusted to constant volume was used as a measurement sample.

<Measurement of Components>

Figure 4:
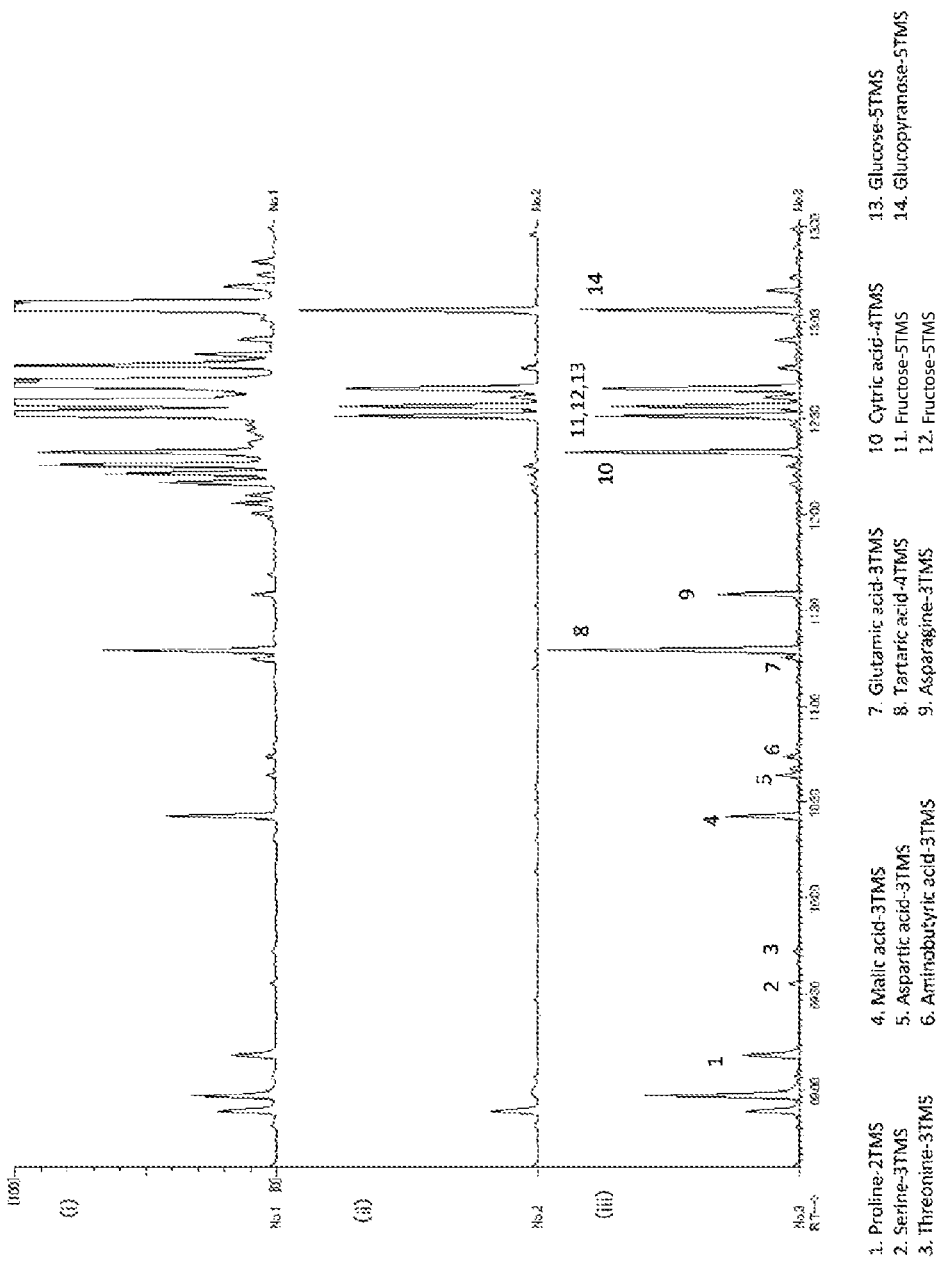
FIG. 4 shows chromatograms of analytical samples that contains trimethylsilylated components and is obtained in Example 3 and Comparative Examples 3 and 4 by a gas chromatography mass spectrometer, in which (i), (ii), and (iii) in the figure are chromatograms of Comparative Example 3, Comparative Example 4, and Example 3, respectively.
Figure 5:
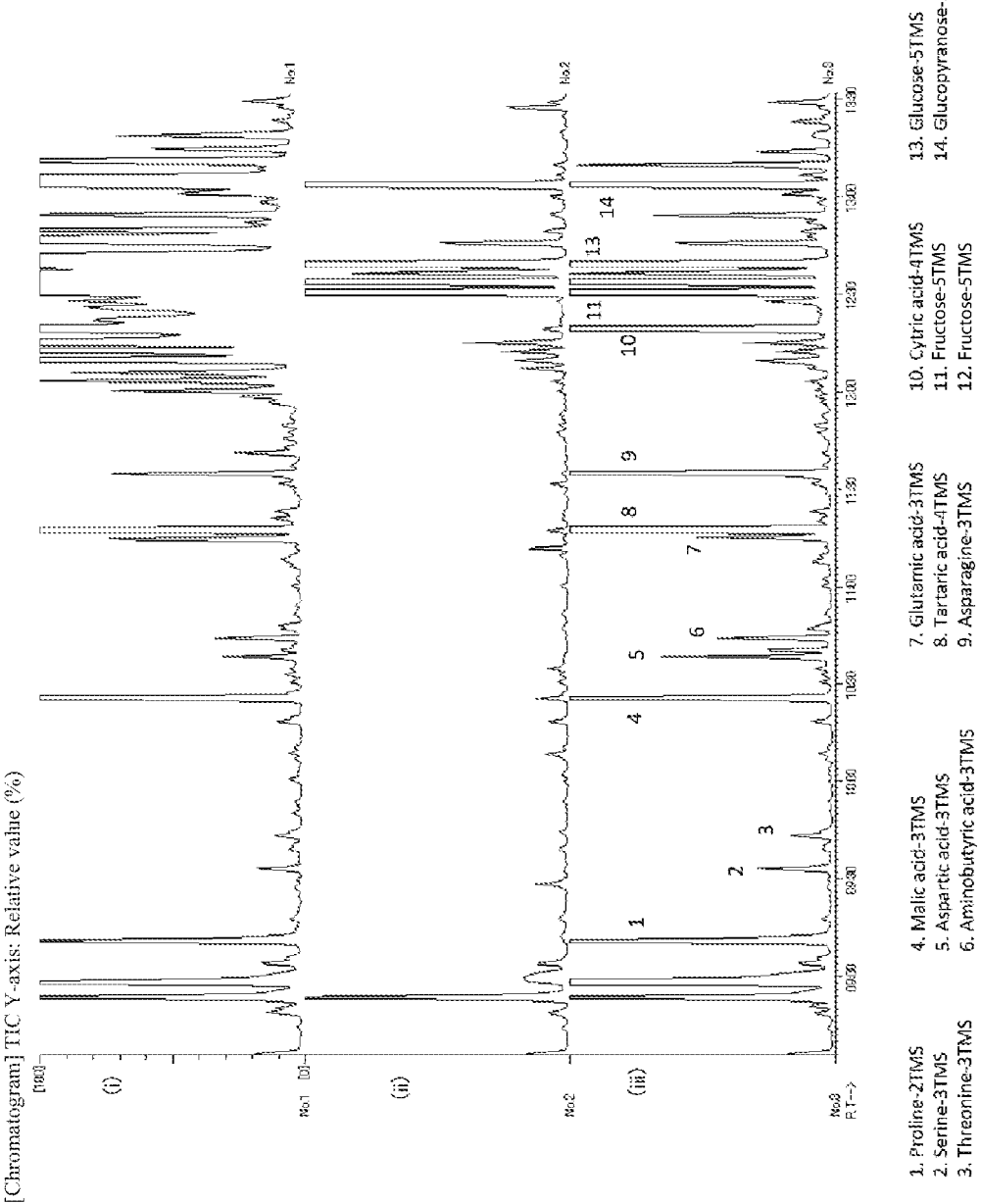
FIG. 5 shows chromatograms obtained by expanding the vertical axis direction in FIG. 4.

Using 10 μL of the measurement sample obtained in the pre-analysis treatment, a measurement was performed using a gas chromatography mass spectrometer. The measurement conditions of this measurement were as follows. Chromatograms of this measurement are shown in FIGS. 4 and 5. These chromatograms reflect the amounts of the saccharides contained in 1 μL (corresponding to approximately μ0.02 μL as the sample to be analyzed (fruit juice)) of the aforementioned sample extraction solution (supernatant), and the amounts of the organic acid and amino acid contained in 101 μL (corresponding to approximately μ2.02 μL as the sample to be analyzed (fruit juice)) of the same sample extraction solution. Incidentally, the chromatograms shown in (iii) in FIGS. 4 and 5 are the result of Example 3.

[GC-MS Analysis Condition]

The analysis conditions are the same as in Example 1.

Numbers 1 to 14 in FIGS. 4 and 5 correspond to trimethylsilylated (TMS) compounds of (1) proline, (2) serine, (3) threonine, (4) malic acid, (5) aspartic acid, (6) aminobutyric acid, (7) glutamic acid, (8) tartaric acid (9) asparagine, (10) citric acid, (11) fructose, (12) fructose, (13) glucose, and (14) glucopyranose, respectively. Here, the fructose of (11) and (12) are isomers, respectively.

Comparative Example 3

<Pre-Analysis Treatment>

As the sample to be analyzed, the same fruit juice as in Example 3 was used. As the reagents for trimethylsilylation and methoximation and the solid phase, the same ones as in Example 3 were used.

100 μL of fruit juice as a sample to be analyzed, 100 μL of distilled water, and 800 μL of acetonitrile were mixed and warmed at 37° C. for 30 minutes, then centrifuged at 14000 rpm for 5 minutes. The resulting supernatant was used as a sample extraction solution, 20 μL of the sample extraction solution (supernatant) and 400 μL of acetonitrile were mixed to obtain a diluted solution. Here, the sample extraction solution (supernatant) is a solution in which components to be analyzed are dissolved in a water-acetonitrile solution containing approximately 20 vol % of water. Further, the diluted solution obtained by mixing 20 μL of the sample extraction solution (supernatant) and 400 μL of acetonitrile is a solution in which components to be analyzed are dissolved in a water-acetonitrile solution containing 1.0 vol % of water. 420 μL (corresponding to approximately 2 μL as a sample to be analyzed) of this diluted solution was supplied to the solid phase. Whereby, the amino acid is retained in a carrier having a strong cation-exchangeable functional group, and the organic acid and the saccharide are retained in a carrier having a strong anion-exchangeable functional group.

Next, 100 μL of acetonitrile was supplied to remove components and water and the like not retained in the solid phase. Thereafter, the same steps as the "derivatization step", "extrusion step", and "constant volume step" in Example 3 were performed to obtain a measurement sample.

<Measurement of Components>

Using 10 μL of the measurement sample obtained in the pre-analysis treatment, a measurement was performed using a gas chromatography mass spectrometer, as in Example 3. Chromatograms of this measurement are shown in FIGS. 4 and 5. These chromatograms reflect the amounts of the saccharides, organic acids and amino acids contained in 420 μL (corresponding to approximately 2 μL as the sample to be analyzed (fruit juice)) of the sample. Incidentally, the chromatograms shown in (i) of FIGS. 4 and 5 are the result of Comparative Example 3.

Comparative Example 4

<Pre-Analysis Treatment>

As the sample to be analyzed, the same fruit juice as in Example 3 was used. As the reagents for trimethylsilylation and methoximation and the solid phase, the same ones as in Example 3 were used.

20 μL of fruit juice as a sample to be analyzed, 180 μL of distilled water, and 800 μL of acetonitrile were mixed and warmed at 37° C. for 30 minutes, then centrifuged at 14000 rpm for 5 minutes. The resulting supernatant was used as a sample extraction solution. 1 μL of the sample extraction solution (supernatant) and 20 μL of acetonitrile were nixed to obtain a diluted solution. Here, in the sample extraction solution (supernatant), components to be analyzed are dissolved in a water-acetonitrile solution containing 20 vol % of water. Further, the solution obtained by mixing 1 μL of the sample extraction solution (supernatant) and 20 μL of acetonitrile is a solution in which components to be analyzed are dissolved in a water-acetonitrile solution containing 1.0 vol % of water. 21 μL (corresponding to approximately 0.02 μL as a sample to be analyzed) of this diluted solution was supplied to the solid phase. Whereby, the amino acid is retained in a carrier having a strong cation-exchangeable functional group, and the organic acid and the saccharide a retained in a carrier having a strong anion-exchangeable functional group.

Thereafter, a measurement sample was obtained in the same manner as in Comparative Example 3.

<Measurement of Components>

Using 10 μL of the measurement sample obtained in the pre-analysis treatment, a measurement was performed using a gas chromatography mass spectrometer, as in Example 3. Chromatograms at this time are shown in FIGS. 4 and 5. This chromatogram reflects the amounts of the saccharides, organic acids and amino acids contained in 21 μL (corresponding to approximately 0.02 μL as the sample to be analyzed (fruit juice)) of the sample. Incidentally, the chromatograms shown in (ii) of FIGS. 4 and 5 are the result of Comparative Example 4.

As shown in (iii) of FIGS. 4 and 5, the pre-analysis treatment method of the present invention is adopted, thereby measuring the saccharides as high concentration components and the amino acids and the organic acids as low concentration components, all at once. On the other hand, as shown in (i) of FIGS. 4 and 5, in Comparative Example 3, although amino acids and organic acids as low concentration components can be measured, the peak shapes of portions corresponding to the saccharides are lost and cannot be analyzed due to the presence of a large amount of saccharides. In addition, as shown in (ii) of FIGS. 4 and 5, in Comparative Example 4, although saccharides as high concentration components can be measured, portion corresponding to amino acids and organic acids are too low in concentration, causing detection of peaks to be unstable, and thus such portion cannot be analyzed.

The invention claimed is:

1. A pre-analysis treatment method for obtaining an analytical sample in which greatly different concentrations of a plurality of components contained in a sample are individually adjusted to predetermined ranges, the pre-analysis treatment method comprising:
    a first retaining step of supplying, to a solid phase, a predetermined amount of the sample containing the plurality of components with the greatly different concentrations, and a predetermined amount of a first solvent, and allowing a component at relatively low concentration to be retained in the solid phase;
    a first washing step of further supplying the first solvent to the solid phase and removing a component at relatively high concentration from the solid phase;
    a second retaining step of supplying the sample in a smaller amount than the predetermined amount supplied in the first retaining step, and a second solvent to the solid phase that has undergone the first washing step, and allowing the component at relatively high concentration to be retained in the solid phase; and
    an elution step of simultaneously extruding the components retained in the solid phase with an extrusion solvent to obtain the analytical sample,
    the first solvent being capable of dissolving the component at relatively low concentration and the component at relatively high concentration, and having characteristics of allowing the component at relatively low concentration to be retained in the solid phase and preventing the component at relatively high concentration from being retained, and
    the second solvent having a characteristic of allowing the component at relatively low concentration and the component at relatively high concentration to be retained in the solid phase.

2. The pre-analysis treatment method according to claim 1, wherein the second solvent is a mixed solvent of a first solvent and a solvent different from the first solvent.

3. The pre-analysis treatment method according to claim 1, wherein the first solvent is a mixed solvent containing a water-soluble organic solvent and water, and the second solvent is a mixed solvent of the first solvent and the water-soluble organic solvent contained in the first solvent.

4. The pre-analysis treatment method according to claim 3, wherein a weight ratio (A/B) of the water-soluble organic solvent (A) to the water (B) in the first solvent is 9/1 to 0/1, and a ratio (A/B) of the second solvent is 500/1 to 20/1.

5. The pre-analysis treatment method according to claim 3, wherein the water-soluble organic solvent is at least one selected from acetonitrile, acetone, and methanol.

6. The pre-analysis treatment method according to claim 1, further supplying a non-aqueous solvent in the first washing step, and comprising a second washing step of supplying a non-aqueous solvent after completion of the second retaining step.

7. The pre-analysis treatment method according to claim 1,
    wherein
    the component at relatively low concentration has a charge bias smaller than that of the component at relatively high concentration, the solid phase is constituted by a carrier having a nonpolar functional group,
    the first solvent has a polarity that allows the component at relatively low concentration to be retained in the solid phase and prevents the component at relatively high concentration from being retained in the solid phase,
    the second solvent is a mixed solvent of the first solvent and a solvent having a polarity higher than that of the first solvent, and has a polarity that allows the component at relatively low concentration and the component at relatively high concentration to be retained in the solid phase, and
    the extrusion solvent has a polarity lower than that of the first solvent.

8. The pre-analysis treatment method according to claim 7, wherein the first solvent contains a water-soluble organic solvent.

9. The pre-analysis treatment method according to claim 1,
    wherein
    the component at relatively low concentration has a charge bias larger than that of the component at relatively high concentration, the solid phase is constituted by a carrier having a polar functional group,
    the first solvent has a polarity that allows the component at relatively low concentration to be retained in the solid phase and prevents the component at relatively high concentration from being retained in the solid phase,
    the second solvent is a mixed solvent containing the first solvent and a solvent having a polarity lower than that of the first solvent, and has a polarity that allows the component at relatively low concentration and the component at relatively high concentration to be retained in the solid phase, and
    the extrusion solvent has a polarity higher than that of the first solvent.

10. The pre-analysis treatment method according to claim 1,
    wherein the second retaining step comprises:
        a capturing step of supplying the sample in a smaller amount than the predetermined amount supplied in the first retaining step and a volume larger than 0% and 25% or less of the apparent volume of the solid phase, to the solid phase that has undergone the first washing step, and allowing the sample containing the component at relatively high concentration to be captured to the solid phase;
        a drying step of supplying gas to the solid phase that has undergone the capturing step and removing volatile components to dry the solid phase; and a second washing step of supplying a second solvent to the solid phase that has undergone the drying step to remove contaminants.

11. The pre-analysis treatment method according to claim 10, wherein the first washing step including a step of supplying the gas after the first solvent.

12. The pre-analysis treatment method according to claim 10, wherein the first solvent is a mixed solvent containing a water-soluble organic solvent and water.

13. The pre-analysis treatment method according to claim 12, wherein the weight ratio (A/B) of the water-soluble organic solvent (A) to the water (B) in the first solvent is from 9/1 to 0/1.

14. The pre-analysis treatment method according to claim 1, comprising a derivatization step of supplying a derivatization reagent to the solid phase, prior to the elution step, to derivatize a component retained in the solid phase and liberate the component from the solid phase, and the elution step is a step of supplying an extrusion solvent to the solid phase after completion of the derivatization step, and simultaneously extruding the derivatized component from the solid phase to obtain the analytical sample.

15. The pre-analysis treatment method according to claim 1, wherein the sample contains a component having an alcoholic hydroxyl group as the component at relatively high concentration and contains a component having a carboxyl group or an amino group as the component at relatively low concentration, and the solid phase is constituted by a carrier having at least one functional group selected from polar functional groups and ion-exchangeable functional groups.

16. The pre-analysis treatment method according to claim 15, wherein the component that has the alcoholic hydroxyl group and is contained in the sample is a saccharide, and the component at relatively low concentration contained in the sample is at least one selected from amine compounds, amino acids, and organic acids.

17. The pre-analysis treatment method according to claim 15, wherein the solid phase has a plurality of ion-exchangeable functional groups having different charges as the ion-exchangeable functional groups.

18. The pre-analysis treatment method according to claim 17, wherein the ion-exchangeable functional group is a strong ion-exchangeable functional group.

19. The pre-analysis treatment method according to claim 1, wherein a ratio of concentrations of the component at relatively high concentration and the component at relatively low concentration (high concentration/low concentration) contained in the sample is 20 or more.

20. An analysis method comprising a step of simultaneously measuring a plurality of components that has greatly different concentrations and are contained in a sample, using the analytical sample obtained by the pre-analysis treatment method as defined in claim 1.

* * * * *